United States Patent
Tezuka et al.

(10) Patent No.: US 8,284,270 B2
(45) Date of Patent: Oct. 9, 2012

(54) IMAGING DEVICE, EDITION DEVICE, IMAGE PROCESSING METHOD, AND PROGRAM

(75) Inventors: Tadanori Tezuka, Fukuoka (JP); Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 488 days.

(21) Appl. No.: 12/529,779

(22) PCT Filed: Feb. 28, 2008

(86) PCT No.: PCT/JP2008/000387
§ 371 (c)(1),
(2), (4) Date: Oct. 1, 2009

(87) PCT Pub. No.: WO2008/129759
PCT Pub. Date: Oct. 30, 2008

(65) Prior Publication Data
US 2010/0026843 A1 Feb. 4, 2010

(30) Foreign Application Priority Data
Mar. 6, 2007 (JP) ................................. 2007-055584

(51) Int. Cl.
*H04N 5/225* (2006.01)
*H04N 5/235* (2006.01)

(52) U.S. Cl. .................................. 348/221.1; 348/229.1

(58) Field of Classification Search ............... 348/221.1, 348/229.1, 333.12, 362
See application file for complete search history.

(56) References Cited

U.S. PATENT DOCUMENTS

| | | | |
|---|---|---|---|
| 6,415,102 B1 | 7/2002 | Fujii et al. | |
| 6,556,243 B1 | 4/2003 | Dotsubo et al. | |
| 6,657,667 B1 * | 12/2003 | Anderson | 348/333.12 |
| 2002/0057352 A1 * | 5/2002 | Yamagishi | 348/232 |
| 2005/0052551 A1 | 3/2005 | Tsunoda | |
| 2005/0057662 A1 * | 3/2005 | Washisu | 348/208.99 |

FOREIGN PATENT DOCUMENTS

| | | |
|---|---|---|
| JP | 6-86158 | 3/1994 |
| JP | 11-4403 | 1/1999 |

(Continued)

OTHER PUBLICATIONS

International Search Report issued Jun. 10, 2008 in International (PCT) Application No. PCT/JP2008/000387, filed Feb. 28, 2008.

(Continued)

*Primary Examiner* — Lin Ye
*Assistant Examiner* — Euel Cowan
(74) *Attorney, Agent, or Firm* — Wenderoth, Lind & Ponack, L.L.P.

(57) ABSTRACT

An imaging device for supporting the user to generate satisfactory synthesized images, not missing photo opportunities. The imaging device generates a plurality of still images continuously and generates a synthesized image from the still images. While the shooting button is pressed to instruct continuous shooting, the imaging device performs a process in which it writes still image data, which is obtained by the continuous shooting, into a recording medium sequentially. After the continuous shooting ends, the imaging device enters a wait state to wait for a new instruction, and then upon receiving an instruction to start generating a synthesized image, it performs a process of generating a synthesized image by using a plurality of pieces of still image data stored in the recording medium.

24 Claims, 23 Drawing Sheets

FOREIGN PATENT DOCUMENTS

| | | |
|---|---|---|
| JP | 11-146323 | 5/1999 |
| JP | 2001-28726 | 1/2001 |
| JP | 2001-268345 | 9/2001 |
| JP | 2003-69888 | 3/2003 |
| JP | 2004-48421 | 2/2004 |
| JP | 2005-86228 | 3/2005 |
| JP | 2005-244724 | 9/2005 |
| JP | 2006-339903 | 12/2006 |
| WO | 2006/064936 | 6/2006 |

OTHER PUBLICATIONS

English Translation of JP 11-146323 (previously submitted in Information Disclosure Statement of Sep. 3, 2009).

English Translation of 2003-69888 (previously submitted in Information Disclosure Statement of Sep. 3, 2009).

English Translation of JP 2001-28726 (previously submitted in Information Disclosure Statement of Sep. 3, 2009).

English Translation of JP 6-86158 (previously submitted in Information Disclosure Statement of Sep. 3, 2009).

English Translation of JP 2001-268345 (previously submitted in Information Disclosure Statement of Sep. 3, 2009).

English Translation of JP 2005-244724 (previously submitted in Information Disclosure Statement of Sep. 3, 2009).

Supplementary Partial European Search Report issued Jan. 20, 2012 in European Patent Application No. 08 72 0301.

* cited by examiner

FIG. 1
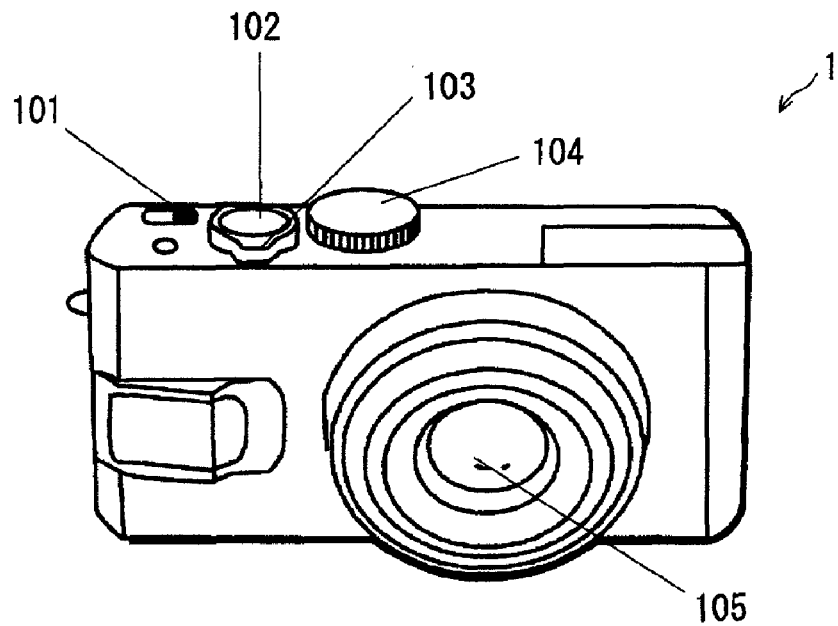
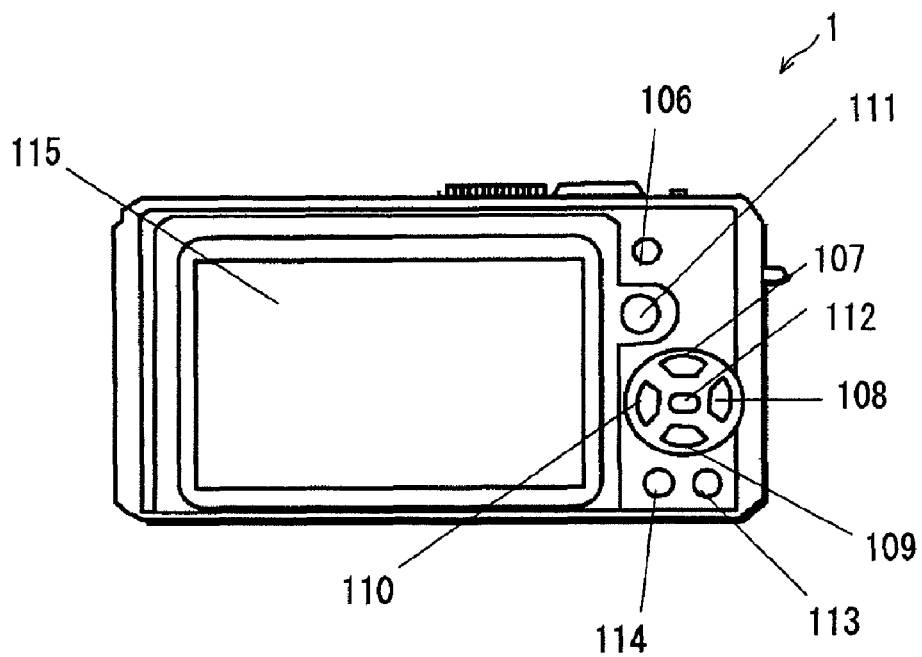

IMAGING DEVICE, EDITION DEVICE, IMAGE PROCESSING METHOD, AND PROGRAM

TECHNICAL FIELD

The present invention relates to a technology for use in an imaging device such as a digital camera or for use in an editing device for performing image processing, of synthesizing a plurality of continuously shot images.

BACKGROUND ART

Some of conventional imaging devices such as digital still cameras have a function to shoot a plurality of images continuously, and a function to generate a still image by synthesizing parts of the continuously shot images. For example, Patent Document 1 identified below discloses a method of generating a still image with a shutter speed that is different from a shutter speed at the time of the shooting, by storing the continuously shot images in a temporary buffer, and synthesizing parts of the images stored in the temporary buffer.

In the imaging device disclosed in Patent Document 1, when a shutter is pressed in the continuous shooting mode, a predetermined number of images are shot continuously at set intervals, and the shot images are stored in a buffer provided in a DRAM (Dynamic Random Access Memory) which temporarily stores images in a time series. The imaging device stores the continuously shot images in the buffer, and immediately after the continuous shooting ends, starts the synthesizing process to generate a synthesized image, and stores the generated synthesized image. In the synthesizing process, a synthesized image to be stored is generated in accordance with instructions of the user, such as an instruction for changing the number of images to be synthesized.

As described above, in a conventional imaging device, when a shutter is pressed in the continuous shooting mode, a predetermined number of images are shot continuously, and immediately after the continuous shooting ends, the synthesizing process is started, and the generated synthesized image (still image) is stored.

The structure makes it possible to generate a still image with a shutter speed that is different from a shutter speed at the time of the continuous shooting, and to obtain, from desired images in the continuously shot images, an image that is equivalent to a still image shot at a desired shutter speed.

Patent Document 1: Japanese Patent Application Publication No. 2005-86228

SUMMARY OF THE INVENTION

The Problems the Invention is Going to Solve

However, in such a conventional imaging device, the synthesizing process is performed immediately after the continuous shooting ends, and the next continuous shooting cannot be performed during the synthesizing process. That is to say, if the next photo opportunity comes during the synthesizing process, the shooting cannot be performed.

With this structure, there may be cases where the user is overly concerned about the next photo opportunity, and cannot obtain a satisfactory synthesized image.

Conversely, there may be cases where the user is so deeply concentrated on generating a satisfactory synthesized image, and misses the next photo opportunity.

It is therefore an object of the present invention to provide an imaging device, editing device, image processing method, and program for supporting the user to generate satisfactory synthesized images, not missing photo opportunities.

Means to Solve the Problems

The above-described object is fulfilled by an imaging device for generating a plurality of still images continuously and generating a synthesized image from the still images, the imaging device comprising: a shooting button which, when pressed, instructs a continuous shooting; an imaging unit operable to generate still image data from incident light; a still image data writing unit operable to write the generated still image data into a recording medium; an editing unit operable to generate a synthesized image by using a plurality of continuous pieces of still image data; and a control unit operable to perform a process of storing sequentially, into the recording medium, the plurality of pieces of still image data obtained by the continuous shooting, by repeatedly controlling the imaging unit and the still image data writing unit while the shooting button is pressed to instruct the continuous shooting, and after the continuous shooting ends, enter a wait state to wait for a new instruction, and then upon receiving an instruction to start generating a synthesized image, control the editing unit to perform a process of generating a synthesized image by using two or more pieces of still image data stored in the recording medium.

Effects of the Invention

With the above-described structure, the imaging device does not generate a synthesized image until it receives an instruction to generate a synthesized image. This enables the user to perform the continuous shooting a plurality of times continuously, without missing a photo opportunity. Also, the imaging device generates a synthesized image in a period during which the continuous shooting is not desired. This enables the user to generate a satisfactory synthesized image, without being concerned about the next photo opportunity.

In the above-stated imaging device, the control unit may further write, as one group, all pieces of still image data generated by repeatedly controlling the imaging unit and the still image data writing unit, into the recording medium, by associating each piece of still image data in the group with continuous shooting mode identification information indicating the continuous shooting, and the editing unit generates the synthesized image by using one or more pieces of still image data among the still image data recorded in association with the continuous shooting mode identification information in the recording medium.

With the above-described structure, the imaging device associates the continuous shooting mode identification information with, as one group, all pieces of still image data generated by the continuous shooting. This makes it possible to easily identify one or more pieces of still image data to be used to generate the synthesized image.

In the above-stated imaging device, the editing unit may include: a determining sub-unit operable to determine first still image data and second still image data out of the generated all pieces of still image data; an obtaining sub-unit operable to obtain a sequential pieces of still image data, which starts with the first still image data and ends with the second still image data, from the recording medium; and a synthesizing sub-unit operable to generate the synthesized image by synthesizing the obtained sequential pieces of still image data.

With the above-described structure, the imaging device determines the first still image data and the second still image data. This makes it possible to easily identify the range of one or more pieces of still image data to be used to generate the synthesized image.

In the above-stated imaging device, the synthesizing sub-unit may obtain pixel values of pixels at a same position in still images respectively represented by the sequential pieces of still image data, and adjusts brightness with respect to each of the obtained pixel values, determines, based on pixel values after the brightness adjustment, a pixel value of a pixel at the same position in the synthesized image to be generated, and generates the synthesized image by repeating the obtaining of pixel values, the adjusting of brightness, and the determining of pixel value until pixel values of all pixels constituting the synthesized image to be generated are determined.

With the above-described structure, the imaging device can generate pixels of the synthesized image from the pixels of still images represented by the obtained sequential pieces of still image data.

In the above-stated imaging device, the synthesizing sub-unit may calculate adjusted pixel values by adjusting brightness with respect to each pixel value obtained from the sequential pieces of still image data, depending on circumstances of still image data to which the each pixel value belongs to, and determine the pixel value of the pixel at the same position in the synthesized image to be generated, based on an average of all calculated adjusted pixel values.

With the above-described structure, the imaging device can generate the synthesized image based on the average of all calculated adjusted pixel values.

In the above-stated imaging device, the still image data writing unit may write the still image data into the recording medium after attaching a continuous shooting number to each piece of the still image data, the continuous shooting number indicating an order of each piece in the continuous shooting, and the synthesizing sub-unit generates a pixel at a position indicated by a coordinate (x,y) in the synthesized image to be generated, by calculating, with use of Equation 1, a pixel value P'(x,y) at the coordinate (x,y) in the synthesized image to be generated, $$P'(x, y) = \beta(x, y) \frac{\sum_{i=a}^{b} \alpha_i(x, y) P_i(x, y)}{(b - a + 1)}$$ [Equation 1]

in Equation 1, "a" represents a first continuous shooting number attached to the first still image data, "b" represents a second continuous shooting number attached to the second still image data, "Pi(x,y)" represents a pixel value of a pixel indicated by the coordinate (x,y) in a still image represented by a piece of still image data attached with continuous shooting number "i", "αi(x,y)" represents a constant for adjustment of brightness to be set for the pixel at the coordinate (x,y) of the $i^{th}$ piece of still image data, and "β(x,y)" represents a constant for adjustment of brightness to be set for a pixel indicated by the coordinate (x,y) in a still image after the synthesizing.

With the above-described structure, the imaging device can perform the synthesizing differently onto a specific object and onto the remaining portion of the image, by changing, with use of Equation 1, the value of αi(x,y) with respect to only a specific area of each image to be synthesized. This makes it possible to obtain a synthesized image in which only a moving object has the effect of the flash motion.

In the above-stated imaging device, the still image data writing unit may write the still image data into the recording medium after attaching a continuous shooting number to each piece of the still image data, the continuous shooting number indicating an order of each piece in the continuous shooting, and the synthesizing sub-unit generates a pixel at a position indicated by a coordinate (x,y) in the synthesized image, by calculating, with use of Equation 2, a pixel value P'(x,y) at the coordinate (x,y) in the synthesized image, $$P'(x, y) = \beta \frac{\sum_{i=a}^{b} \alpha_i P_i(x, y)}{(b - a + 1)}$$ [Equation 2]

in Equation 2, "a" represents a first continuous shooting number attached to the first still image data, "b" represents a second continuous shooting number attached to the second still image data, "Pi(x,y)" represents a pixel value of a pixel indicated by the coordinate (x,y) in a still image represented by a piece of still image data attached with continuous shooting number "i", "αi" represents a constant for adjustment of brightness to be set for an $i^{th}$ still image, and "β" represents a constant for adjustment of brightness to be set for a still image after the synthesizing.

With the above-described structure, the imaging device can perform, with use of Equation 2, correction of exposure in unit of an image, and correction of exposure after the synthesizing. This makes it possible to generate a synthesized image having a desired brightness from a plurality of continuously shot images in which the light source moves at a high speed, and which, if synthesized normally, would result in a dark synthesized image.

In the above-stated imaging device, the control unit may associate exposure information, which is set based on a predetermined exposure value, with the still image data, the synthesizing sub-unit calculates adjusted pixel values by adjusting brightness with respect to each pixel value obtained from the sequential pieces of still image data, depending on circumstances of still image data to which the each pixel value belongs to, and determines the pixel value of the pixel at the same position in the synthesized image to be generated, based on all calculated adjusted pixel values and exposure information that corresponds to each of the sequential pieces of still image data.

With the above-described structure, the imaging device can generate a synthesized image by using still image data whose brightness has been adjusted based on the exposure information.

In the above-stated imaging device, the still image data writing unit may write the still image data into the recording medium after attaching a continuous shooting number to each piece of the still image data, the continuous shooting number indicating an order of each piece in the continuous shooting, and the synthesizing sub-unit generates a pixel at a position indicated by a coordinate (x,y) in the synthesized image to be generated, by calculating, with use of Equation 3, a pixel value P'(x,y) at the coordinate (x,y) in the synthesized image to be generated, $$P'(x, y) = \beta(x, y) \frac{\sum_{i=a}^{b} \alpha_i(x, y) P_i(x, y)}{\sum_{i=a}^{b} E_i}$$ [Equation 3]

in Equation 3, "a" represents a first continuous shooting number attached to the first still image data, "b" represents a second continuous shooting number attached to the second still image data, "Pi(x,y)" represents a pixel value of a pixel indicated by the coordinate (x,y) in a still image represented by a piece of still image data attached with continuous shooting number "i", "Ei" represents exposure information associated with an $i^{th}$ still image, "αi(x,y)" represents a constant for adjustment of brightness to be set for the pixel at the coordinate (x,y) of the $i^{th}$ piece of still image data, and "β(x, y)" represents a constant for adjustment of brightness to be set for a pixel indicated by the coordinate (x,y) in a still image after the synthesizing.

With the above-described structure, the imaging device can adjust the exposure of the synthesized image based on the exposure information at a high-speed shooting, by using Equation 3.

In the above-stated imaging device, the control unit may further write, respectively as first information and second information, preliminarily determined first initial value and second initial value, into the recording medium by associating the first initial value and the second initial value with all pieces of still image data generated by repeatedly controlling the imaging unit and the still image data writing unit, the determining sub-unit determines the first still image data and the second still image data by obtaining and storing the first information and the second information, and the obtaining sub-unit obtains the sequential pieces of still image data that starts with the first still image data indicated by the first information, and ends with the second still image data indicated by the second information.

With the above-described structure, the imaging device is provided with the first initial value and the second initial value respectively as the first information and the second information. With this structure, when a synthesized image is to be generated for the first time from a plurality of pieces of generated still image data, the synthesized image can be generated easily by using the first initial value and the second initial value.

In the above-stated imaging device, when receiving, from a user, a change instruction instructing to change at least one of the first information and the second information, the determining sub-unit may further update at least one of the first information and the second information in accordance with the received change instruction, and the imaging device further comprises an information writing unit operable to overwrite update-target information recorded in the recording medium with updated information held by the determining sub-unit.

With the above-described structure, the imaging device updates at least one of the first information and the second information, updates at least one of the first information and the second information recorded in the recording medium that is targeted to be updated. With this structure, when it is to re-generate a synthesized image, the imaging device can easily restore the synthesized image that was generated previously, by reading out the first information and the second information from the recording medium.

In the above-stated imaging device, another piece of still image data that was obtained by a shooting which is different from the continuous shooting may be recorded in the recording medium, and the determining sub-unit identifies a still image data group that is composed of one or more pieces of still image data associated with the continuous shooting mode identification information, determines the first still image data and the second still image data out of the identified still image data group.

With the above-described structure, even if the recording medium stores still image data that was shot by a shooting that is different from the continuous shooting, the imaging device can identify a still image data group shot by the continuous shooting by referring to the continuous shooting mode identification information, and obtain the first and second still image data from the identified still image data group.

In the above-stated imaging device, the control unit may further write, into the recording medium, a continuous shooting shutter speed indicating a shutter speed at the continuous shooting, by associating the continuous shooting shutter speed with all pieces of still image data generated by repeatedly controlling the imaging unit and the still image data writing unit, the editing unit calculates a synthesized shutter speed indicating a shutter speed after the synthesizing, by multiplying the continuous shooting shutter speed by the number of pieces of still image data that are used for generating the synthesized image, and the imaging device further comprises a display unit operable to display the continuous shooting shutter speed and the synthesized shutter speed.

With the above-described structure, the imaging device displays the synthesized shutter speed of the synthesized image, and thus the user can recognize the synthesized shutter speed of the generated synthesized image easily. Also, the user can generate a synthesized image at a desired synthesized shutter speed.

BRIEF DESCRIPTION OF THE DRAWING

FIG. 1 shows an overview of the imaging device 1.

Figure 2:
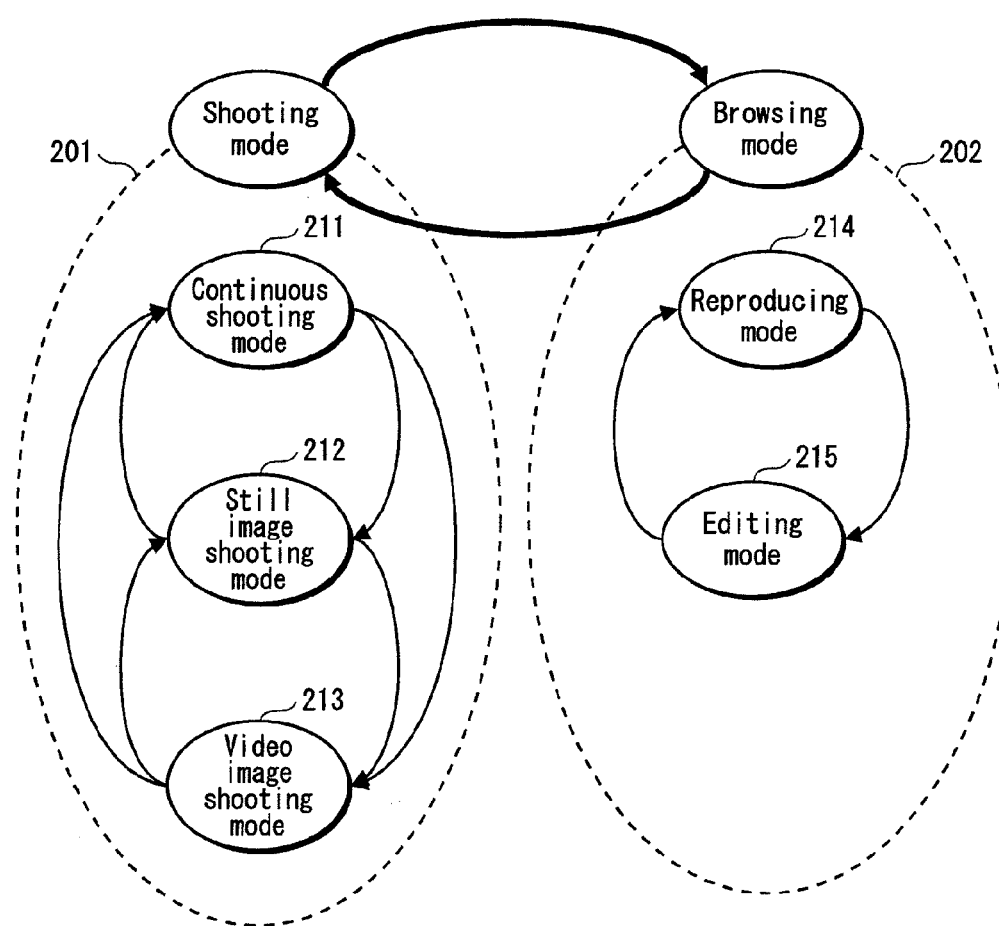
FIG. 2 shows the basic mode transition in the imaging device 1.

DESCRIPTION OF CHARACTERS 1 imaging device
101 power switch
102 shutter button
103 zoom lever
104 mode dial
105 lens 105
106 focus and exposure fixing button
107-111 function buttons
112 menu/enter button 112
113 delete button
114 display button
115 liquid crystal monitor
300 imaging lens
301 mechanism
302 imaging element
303 front end
304 DSP
305 compression/extension circuit
306 shutter driver
308 memory card
309 CPU
310 DRAM
311 shutter driver
312 zoom driver
313 focus driver
351 imaging unit
352 function executing unit
355 continuous shooting program
356 editing program
361 first processing unit
362 second processing unit
371 continuous shooting control unit
372 first writing unit
373 speed setting unit
375 setting unit
376 repeat control unit
377 identification information generating unit
381 editing processing unit
382 second writing unit
391 instruction receiving unit
392 searching unit
393 parameter updating unit
394 synthesizing unit
395 output control unit

DETAILED DESCRIPTION OF THE INVENTION

1. Embodiment 1

The following describes an imaging device 1 in Embodiment 1.

1.1 Overview of Imaging Device 1

FIG. 1 shows an overview of the imaging device 1.

The imaging device 1, as shown in FIG. 1, includes a power switch 101 for switching on/off the power, a shutter button 102 for performing the shooting, a zoom lever 103 for performing an enlargement/reduction of the subject, a mode dial 104, a lens 105, a focus and exposure fixing button 106, function buttons 107-111, a menu/enter button 112, a cancel and delete button 113, a display button 114, and a liquid crystal monitor 115 for displaying a preview or a GUI screen.

The mode dial 104 is a dial used to change the operation mode of the imaging device 1. For example, by operating the mode dial 104, it is possible to select and set one of the still image shooting mode, video image shooting mode, and reproducing mode which are the modes provided basically in the digital cameras, and the continuous shooting mode in which one or more images are shot continuously, and the editing mode in which a synthesized image is generated by editing the continuously shot images.

FIG. 2 shows the basic mode transition in the imaging device 1.

As shown in FIG. 2, the imaging device 1 has roughly two modes: a shooting mode 201; and a browsing mode 202. The imaging device 1 can be changed between the shooting mode 201 and the browsing mode 202 by the mode dial 104.

Also, the shooting mode 201 includes a continuous shooting mode 211, a still image shooting mode 212, and a video image shooting mode 213, and the browsing mode 202 includes a reproducing mode 214 and an editing mode 215. The imaging device 1 can be changed among the continuous shooting mode 211, still image shooting mode 212, and video image shooting mode 213 in the shooting mode 201 by the mode dial 104, and can be changed between the reproducing mode 214 and editing mode 215 in the browsing mode 202.

The function buttons 107-111 change their functions depending on the operation mode in which the imaging device is currently in. For example, the function button 107 provides a function to set the operation of the flash in the shooting mode, and provides a function to move the cursor on the GUI upwards in the browsing mode.

The menu/enter button 112 functions either as a menu button or as an enter button depending on the current operation state.

The cancel and delete button 113 functions either as a cancel button or as a delete button depending on the current operation state.

1.2 Structure of Imaging Device 1

Figure 3:
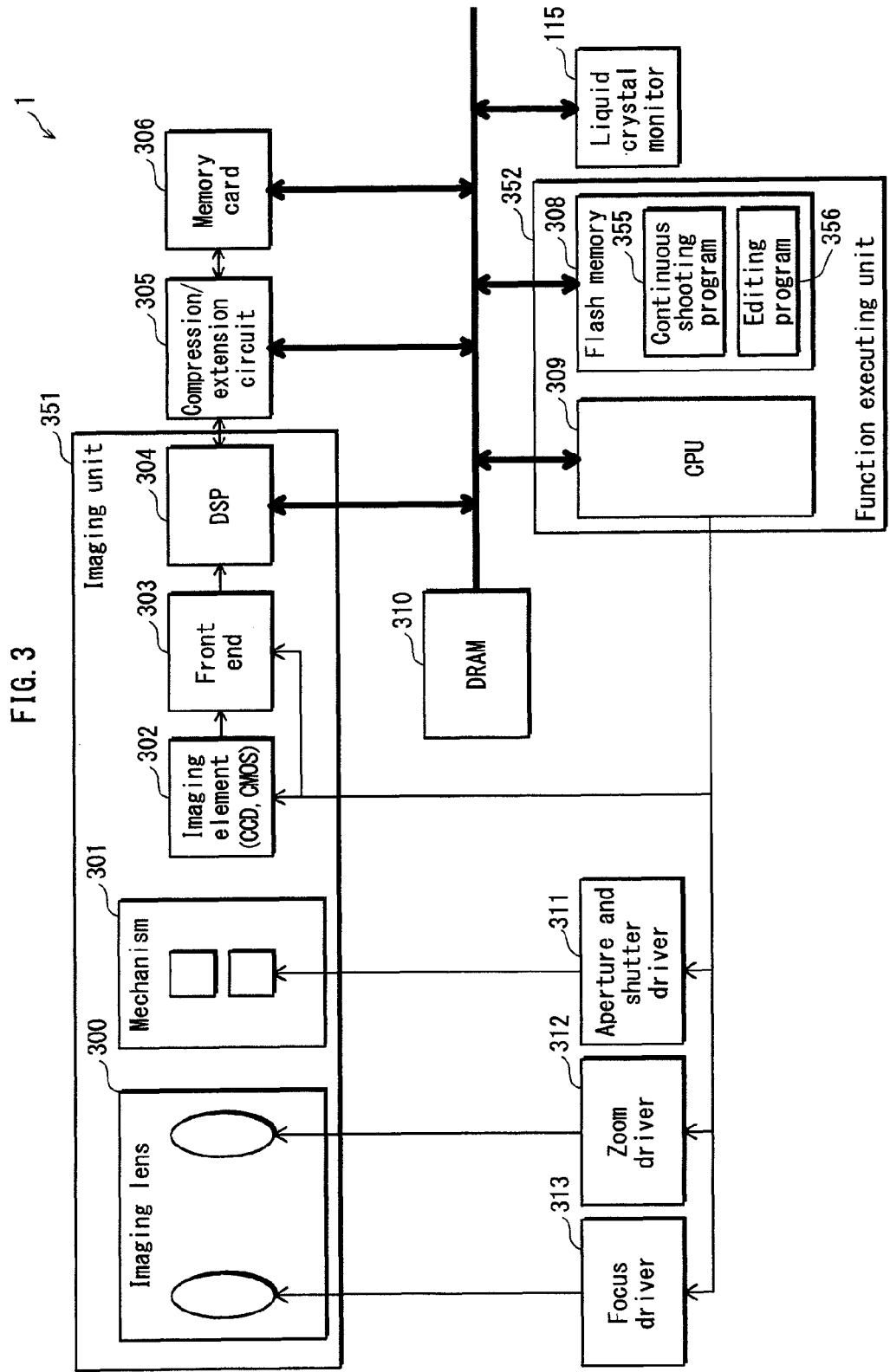
FIG. 3 is a block diagram showing the structure of the imaging device 1.

The imaging device 1, as shown in FIG. 3, includes an imaging unit 351, a function executing unit 352, a compression/extension circuit 305, a memory card (secondary storage medium) 306, a liquid crystal monitor 115, a DRAM 310 used as a work area or a temporary storage, an aperture and shutter driver 311 for performing the aperture and shutter control, a zoom driver 312 for performing the zoom control, and a focus driver 313 for performing the focus control.

The function executing unit 352 includes a flash memory 308 storing programs, and a CPU (Central Processing Unit) 309 for controlling the entire system.

The imaging unit 351 includes an imaging lens 300, a mechanism 301, an imaging element 302 such as a CCD (Charge Coupled Device) or a CMOS (Complementary Metal Oxide Semiconductor), a front end 303 for converting the input from the CCD or CMOS sensor into digital data, and a DSP (Digital Signal Processor) 304 for processing signals of the input image data.

The imaging lens 300 is used to form an image of the subject, and is composed of a zoom lens and a focus lens, where the zoom lens is used to achieve the zoom function and the focus lens is used to take the focus of the subject.

The mechanism 301 is composed of a mechanical shutter, an aperture for adjusting the brightness of the subject, a filter and the like, and releases the shutter and adjusts the aperture.

The imaging element 302 is composed of a CCD or a CMOS, generates analog image data by converting the image of the subject formed by the imaging lens 300 into an electric signal, and outputs the analog image data to the front end 303.

The front end 303 performs the gain adjustment and the A/D (Analog/Digital) conversion onto the output from the imaging element 302, and outputs digital data of the image data.

The DSP 304 generates the brightness-and-color-difference information or the RGB data by processing the input pixel data.

The compression/extension circuit 305 is a digital signal processor that compresses or extends the image data generated by the DSP 304, the image data being in the JPEG format, MPEG format or the like.

The memory card 306 is a detachable storage medium (recording medium) for recording of image data, such as an SD memory, Compact Flash™, memory stick, xD card, and stores compressed image data.

Now, a description is given of the function executing unit 352.

The function executing unit 352, as described above, includes the flash memory 308 and the CPU 309.

The function executing unit 352 performs the focus/exposure determining process, still image shooting process, reproducing (preview) process, shooting process in the continuous shooting mode, and synthesizing process in the editing mode.

The function executing unit 352, when the mode is switched to a new mode by a user operation (mode switch), activates and starts the process corresponding to the new mode.

The focus/exposure determining process, still image shooting process, and reproducing (preview) process are known technologies, description thereof is omitted. Here, the shooting process in the continuous shooting mode and the synthesizing process in the editing mode are described.

The flash memory 308, as shown in FIG. 3, includes a continuous shooting program 355 and an editing program 356.

The continuous shooting program 355 performs the shooting process in the continuous shooting mode.

The editing program 356 performs the process of generating one synthesized image by performing the synthesizing process onto one or more continuously shot images. Note that, when one synthesized image is generated from one image, the synthesized image is the same as the image before the synthesizing process. In other words, the editing program 356 performs the process of generating one piece of synthesized image data by performing the synthesizing process onto one or more pieces of image data obtained by the continuous shooting. Note that one piece or one frame of image data represents one image, and one piece of synthesized image data represents one synthesized image.

Note also that each program includes data to be used by the program itself, as well as the code that indicates the operation content.

The CPU 309 realizes the functions of the function executing unit 352 by cooperating with other constitutional elements by using the continuous shooting program 355 and the editing program 356.

Figure 4:
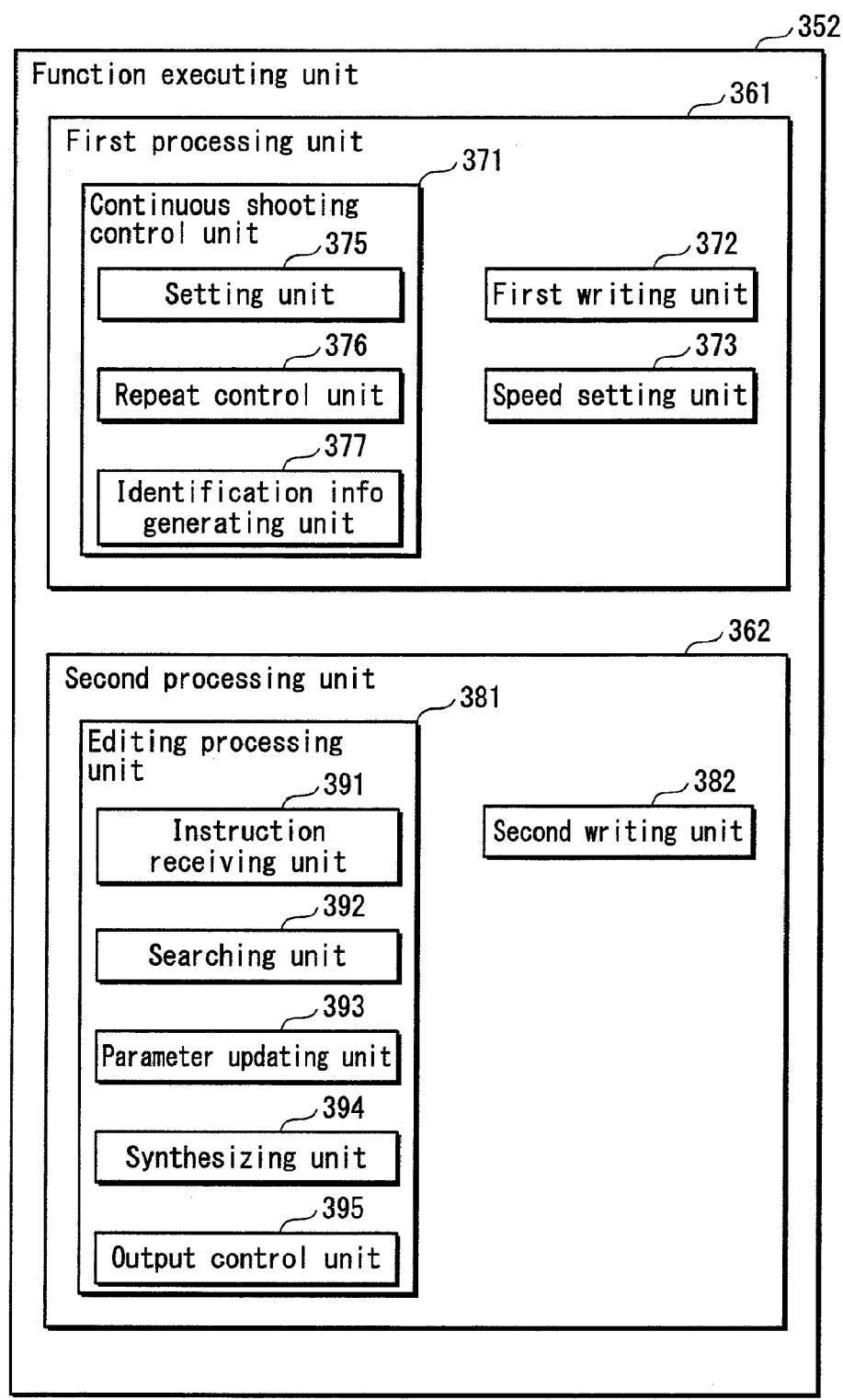
FIG. 4 is a block diagram showing the structure of the function executing unit 352.

The function executing unit 352, as shown in FIG. 4, is composed of a first processing unit 361 and a second processing unit 362.

The first processing unit 361 has a function that is realized when the CPU 309 cooperates with other constitutional elements by using the continuous shooting program 355.

The second processing unit 362 has a function that is realized when the CPU 309 cooperates with other constitutional elements by using the editing program 356.

The function executing unit 352 (more specifically, the CPU 309) switches among functions by switching among programs to be activated, in accordance with an instruction from the user.

Figure 5:
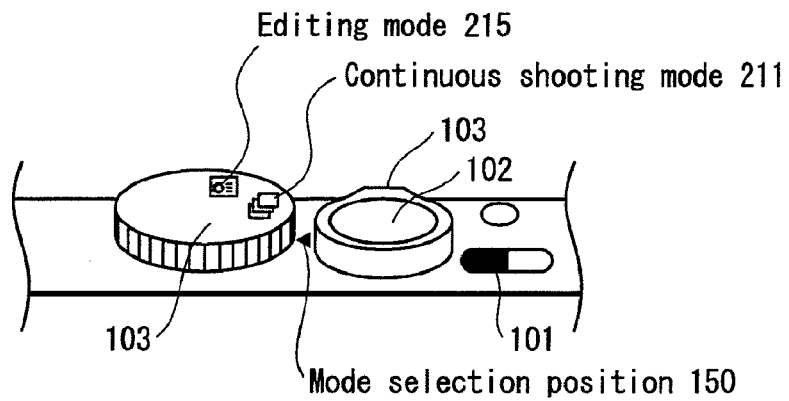
FIG. 5 shows an example of the mode dial 103 provided in the imaging device 1.
Figure 6:
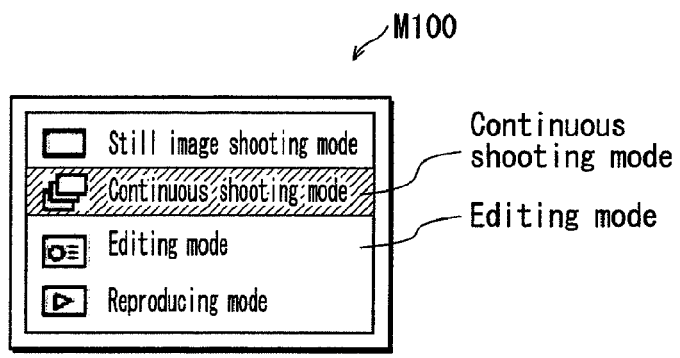
FIG. 6 shows an example of the mode setting menu M100 provided in the imaging device 1.

More specifically, the user switches among modes by using the mode dial 104 shown in FIG. 5 or by using a mode setting menu M100 that is displayed on the GUI on the liquid crystal monitor 115 as shown in FIG. 6. When the user specifies a mode in this way, the CPU 309 realizes the function desired by the user, by activating the program corresponding to the mode specified by the user.

For example, the function executing unit 352 activates the continuous shooting program when the user operates the mode dial 104 so that an image on the mode dial 104 representing the continuous shooting mode stops at a mode selection position 150.

Also, the function executing unit 352 activates the editing program and starts generating a synthesized image when the user switches the mode to the editing mode.

The following describes the first processing unit 361 and the second processing unit 362.

(1) First Processing Unit 361

The first processing unit 361 is composed of a continuous shooting control unit 371, a first writing unit 372, and a speed setting unit 373.

(1-1) Speed Setting Unit 373

The speed setting unit 373, when the continuous shooting mode is set, temporarily stores a predetermined continuous shooting speed (for example, 60 frames/second ($\frac{1}{60}$)) into the DRAM 310.

Figure 7:
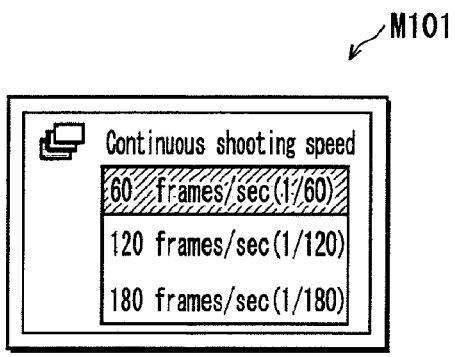
FIG. 7 shows an example of the continuous shooting speed setting menu M101 provided in the imaging device 1.

The speed setting unit 373, upon receiving a continuous shooting speed setting request from the user, displays a continuous shooting speed setting menu M101 shown in FIG. 7, and receives specification of the continuous shooting speed from the user.

The speed setting unit 373, upon receiving the specification of the continuous shooting speed from the user, changes (updates) the continuous shooting speed temporarily stored in the DRAM 310 to the specified continuous shooting speed.

In the present embodiment, 60 frames/second, 120 frames/second, and 180 frames/second can be set as the continuous shooting speeds. However, not limited to these, continuous shooting speeds higher or lower than these may be set. Note that, to prevent a moving object from being shot separately in a plurality of images when the images are shot at a slow shutter speed, it is preferable that the shutter speed is close to the continuous shooting speed. For example, when 60 frames/second is set, it is preferable that the shutter speed is set to a value close to $\frac{1}{60}$. By setting the shutter speed and the continuous shooting speed to be close to each other when a slow shutter image is to be generated from the continuously shot images, it is possible to generate an image that is equivalent in quality to an image actually shot at the slow shutter speed.

Figure 8:
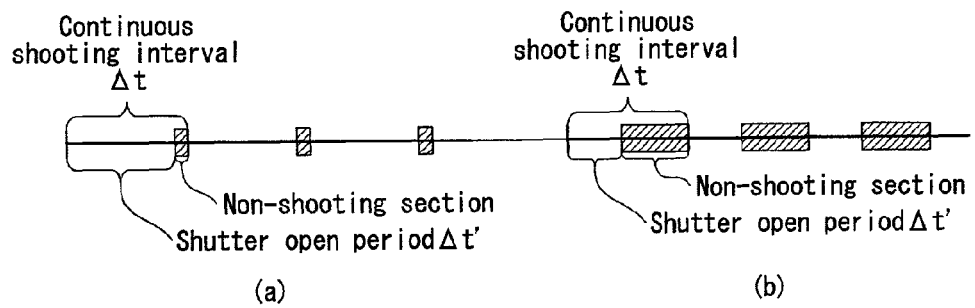
FIG. 8 shows relationships between the shutter speed and the continuous shooting speed.

FIG. 8 explains this schematically. The part (a) of FIG. 8 shows a case where the shutter speed is very close to the continuous shooting speed, and in this example, the shooting interval $\Delta t$ in the continuous shooting is approximately equal to the shutter open period $\Delta t'$ during which the shutter is open. In this case, a period marked with diagonal lines during which the shutter is closed, namely a period during which the shooting is not performed, is short. As a result, when a plurality of continuously shot images are synthesized, the synthesized image covers almost the entire period. The part (b) of FIG. 8 shows a case where the shutter speed is greatly different from the continuous shooting speed, and in this example, the shutter open period Δt' is greatly shorter than the continuous shooting interval Δt (in the drawing, less than half). In this case, the period marked with diagonal lines during which the shooting is not performed is long. As a result, when a plurality of continuously shot images are synthesized, the synthesized image includes, in a dotted manner, areas that have not been shot in the period. As understood from the drawing, when a slow shutter image is to be generated from a plurality of continuously shot images, an image, which is more equivalent in quality to an image that is actually shot at the slow shutter speed, can be generated if the shutter speed is more very close to the continuous shooting speed, as shown in the part (a) of FIG. 8.

(1-2) First Writing Unit 372

The first writing unit 372 compresses the image data generated by the imaging unit 351 by using the compression/extension circuit 305, and writes the compressed image data into the memory card 306.

In so doing, the first writing unit 372 attaches a serial number indicating an order of an image in the continuous shooting (continuous shooting number) to the header of each of one or more pieces of compressed image data, and writes the compressed image data with the continuous shooting number into the memory card 306.

In the present embodiment, the first writing unit 372 writes the compressed image data into the memory card 306. However, not limited to this, for example, the first writing unit 372 may output, to the compression/extension circuit 305, an instruction for writing the compressed image data into the memory card 306 so that the compression/extension circuit 305 is controlled to write the compressed image data.

As described above, the memory card 306 may be an SD card, memory stick, Compact Flash™, smart media, xD card, detachable hard disk, or the like. In the present embodiment, the image data taken into the imaging device is compressed by the compression/extension circuit 305, and the compressed image data is written into the memory card 306 in sequence. However, not limited to this, the first writing unit 372 may record the non-compressed image data, or what is called raw data that has been taken by the imaging element, directly into the memory card 306 in sequence.

(1-3) Continuous Shooting Control Unit 371

The continuous shooting control unit 371 is composed of a setting unit 375, a repeat control unit 376, and an identification information generating unit 377, and performs the control in relation to the continuous shooting.

When the shutter button is pressed in the continuous shooting mode, the continuous shooting control unit 371 starts recording the image data received from the imaging element 302.

The following describes details of the operation.

(Setting Unit 375)

The setting unit 375, when the shutter button 102 changes from the non-pressed state to the half-pressed state or to the pressed state, performs the aperture setting and the focus setting by using the aperture and shutter driver 311 and the focus driver 313.

More specifically, if the focal length and the exposure have not been determined when the shutter button 102 is pressed, the setting unit 375 drives mechanisms such as the AF (Automatic Focus) and the AE (Automatic Exposure), and determines the focal length and the exposure.

When the shutter button 102 is half-pressed, the setting unit 375 drives mechanisms such as the AF and the AE, and determines the focal length and the exposure.

Note that, with regards to the focal length, it is also possible fort the imaging device to continue to focus on the subject during the shooting.

Also, when the focal length and the exposure have been manually set by the user, the process of determining the focal length and the exposure may be omitted. Further, with use of the deep focus which does not require the focal length setting, the process of determining the focal length may be omitted.

(Identification Information Generating Unit 377)

The identification information generating unit 377, when the focal length and the exposure are determined by the setting unit 375, generates continuous shooting mode identification information which is used to identify the image data to be written to the memory card 306 as image data that has been shot in the continuous shooting mode. Hereinafter, the image data that has been shot in the continuous shooting mode is referred to as "continuously shot image data" or "continuously shot images".

The continuous shooting mode identification information includes a name of a folder for storing the continuously shot image data (continuously shot images), and includes names of sub-folders that belong to the folder.

The identification information generating unit 377, each time a shooting is performed in the continuous shooting mode, generates a sub-folder for storing the continuously shot image data individually.

Figure 9:
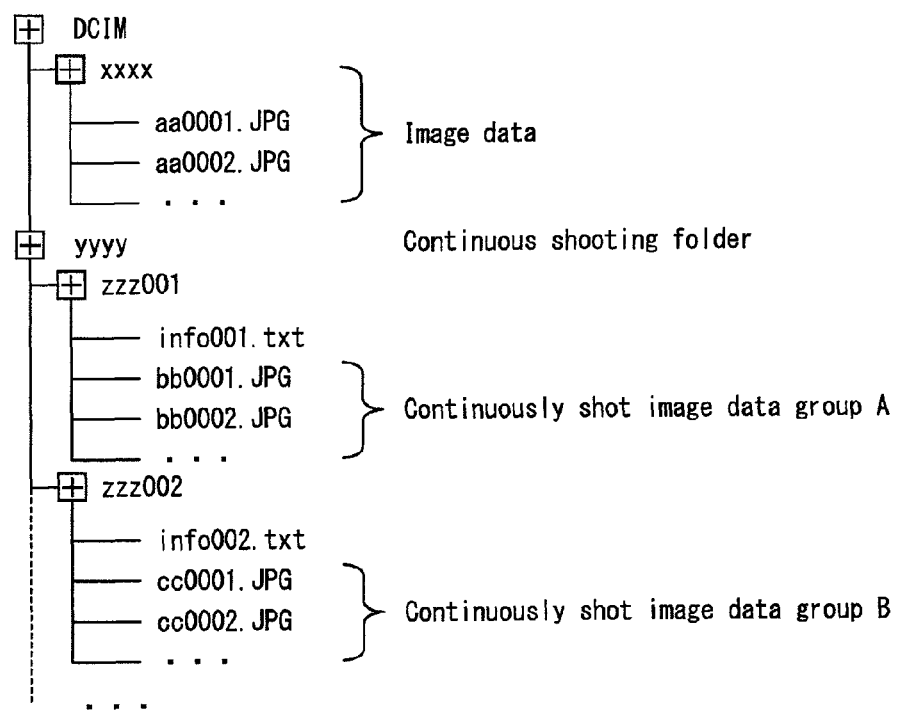
FIG. 9 shows an example of the directory structure of the memory card 306 in the imaging device 1.

FIG. 9 shows an example of the folder structure of the memory card 306. The DCIM folder, which is used in typical digital cameras, is a folder for storing shot still images. The folder "yyyy" is a folder for storing the continuously shot image data. Each folder has, under the folder itself, sub-folders (in this example, "zzz001" and "zzz002") which each store a plurality of pieces of continuously shot image data that were taken in one continuous shooting.

Each sub-folder stores continuously shot image data. For example, sub-folder "zzz001" stores a continuously shot image data group A that includes continuously shot image data "bb0001.JPG", "bb0002.JPG", . . . .

The identification information generating unit 377 generates an information file including shooting information, writes the generated information file under a sub-folder as a piece of continuous shooting mode identification information that is generated each time the a continuous shooting is set in the continuous shooting mode, and performs the initial setting of the memory card to store the continuously shot image data.

Note that the shooting information is information including a shooting speed.

(Repeat Control Unit 376)

The repeat control unit 376 controls the operation of the imaging unit 351 and the first writing unit 372 such that, while the shutter button 102 is being pressed, namely during a continuous shooting, they repeatedly: (i) generate a piece of continuously shot image data based on the continuous shooting speed having been set and the focal length and the exposure determined by the setting unit 375; (ii) compress the generated piece of continuously shot image data; and (iii) write the compressed piece of continuously shot image data into a sub-folder generated by the identification information generating unit 377. More specifically, while the shutter button 102 is being pressed, the repeat control unit 376 keeps on receiving a shooting instruction for the continuous shooting. While it keeps on receiving the shooting instruction, the repeat control unit 376 controls the operation of the imaging unit 351 and the first writing unit 372.

When the user releases the shutter button 102, the repeat control unit 376 ends the recording of the continuously shot image data as it stops controlling the operation of the first writing unit 372. More specifically, when it stops receiving (detecting) the shooting instruction, the setting unit 375 inhibits itself from controlling the operation of the first writing unit 372.

While continuously shot image data is being recorded, the repeat control unit 376 displays an icon that indicates the recording onto the GUI screen on the liquid crystal monitor 115, to notify the user that the continuously shot image data is currently recorded.

In this way, a plurality of pieces of continuously shot image data are recorded into the memory in sequence for a period during which the shutter is pressed. With this structure where the continuously shot image data is temporarily recorded into an external memory card, it is possible to perform the continuous shooting without limitation due to the capacity of the embedded memory.

When a sequence of shootings in a continuous shooting is completed, the imaging device 1 enters the wait state in which it waits for a new input of an instruction (a mode change, a pressing of the shutter for the next continuous shooting, and so on).

(2) Second Processing Unit 362

The second processing unit 362 is composed of an editing processing unit 381 and a second writing unit 382.

The second processing unit 362, when the mode is set to the editing mode, displays a list of only the images shot in the continuous shooting mode that are stored in the memory card 306, on the GUI screen on the liquid crystal monitor 115.

The second processing unit 362, upon receiving a selection of an image out of the images in the displayed list from the user, starts generating synthesized image data of a continuously shot image data group that includes the selected image.

The second processing unit 362, upon receiving from the user a change request requesting a change in relation to the generation of the synthesized image, generates synthesized image data based on the content of the change request. Note that the change request requests, for example, to change the start position of a continuously shot image that is used in the synthesized image (namely, to change the continuous shooting number attached to the piece of continuously shot image dada corresponding to the continuously shot image), to change the number of images to be synthesized, to change the brightness, to change the exposure, or to change the synthesizing mode. The synthesizing mode will be described later.

Figure 10:
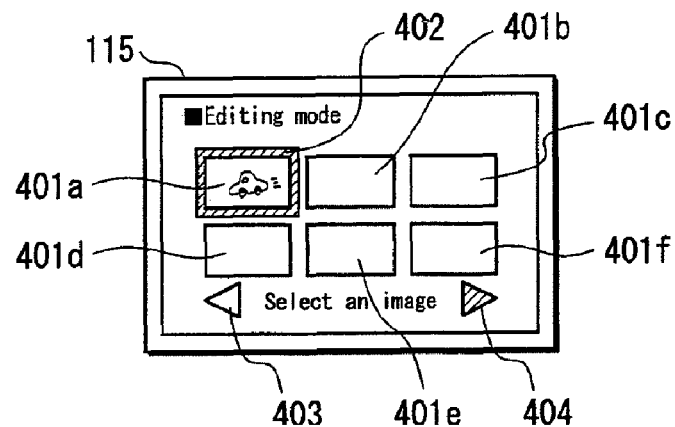
FIG. 10 shows an example of the list display screen in the editing mode in the imaging device 1.

Here, an example of GUI for displaying the list in the editing mode will be described with reference to FIG. 10. FIG. 10 shows the displayed list of representative images (thumbnails 401a to 401f) of the images shot in the continuous shooting mode. Also, in FIG. 10, a selection frame 402 is displayed to indicate a still image (thumbnail) that is currently selected. Note that the selection frame 402 may be at any place in the screen when the mode is switched, and in this example, the selection frame 402 is presumed to be at an image that was shot at a date/time closest to the current time.

In this case, the user selects a still image (a piece of continuously shot image data) that the user desires to edit, by pressing any of the function buttons 107-110 to move the selection frame 402 upward, downward, leftward, and/or rightward. When all the thumbnails are not displayed on one screen, the user can switch the screen from the current page to the previous or next page by pressing the function buttons 107-110 at the upper-right of the thumbnail to move the selection frame 402 rightward or upward, or pressing the function buttons 107-110 at the lower-left of the thumbnail to move the selection frame 402 leftward or downward. Icons 403 and 404 are displayed in the lower portion of the screen, and when they are displayed or change their colors, they respectively indicate that there are the previous page and the next pages.

The editing screen is displayed when the user presses the menu/enter button 112.

Figure 11:
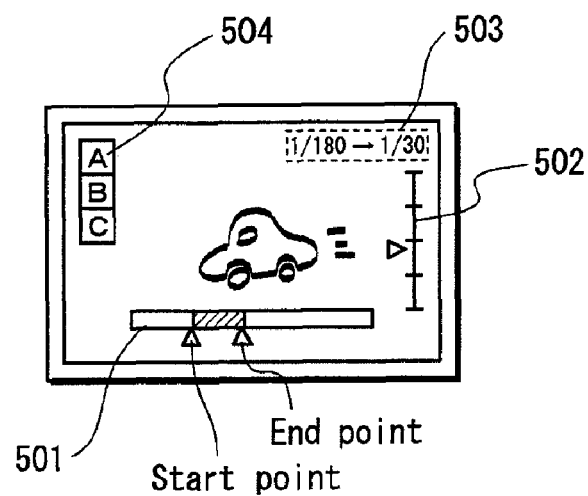
FIG. 11 shows an example of the editing screen in the editing mode in the imaging device 1.

FIG. 11 shows an example of GUI for the editing screen. The editing screen includes: a piece of synthesized image data generated from the selected continuously shot image data group; a slider 501 indicating, by positions, a synthesized portion of the continuously shot image data; a slider 502 for the gain setting for adjusting brightness of the synthesized image; an indicator 503 for indicating the shutter speed at the continuous shooting and the shutter speed after the synthesizing; and an icon 504 for indicating the synthesizing modes. The synthesizing modes include, for example: a mode A in which the synthesizing is performed by a simple averaging; a mode B in which the brightness after the synthesizing is adjusted; and a mode C in which the exposure of each image being synthesized is corrected. The synthesizing itself is performed with use of equations which will be described later. For each of the synthesizing modes, parameters of the equations are preset, and it is determined which parameter is linked to the slider for the gain setting.

The user first determines the synthesizing mode, then adjusts the start point and the end point while viewing the changing synthesized image, and when he/she notices that a desired synthesized image is being displayed, presses the menu/enter button 112 to store the synthesized image data of the synthesized image into the memory card 306 as image data of a still image.

Figure 12:
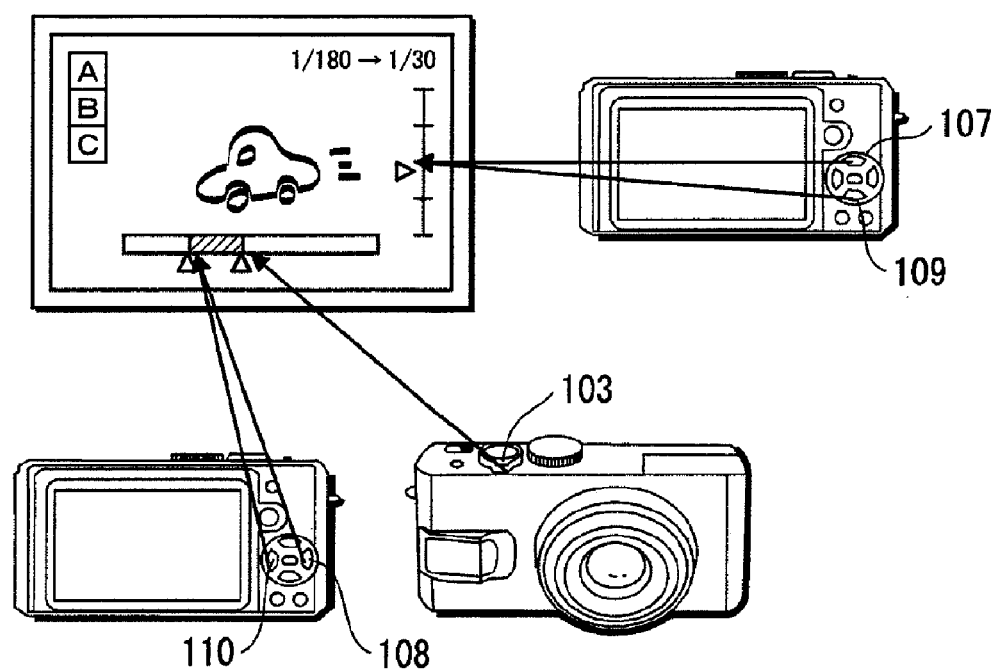
FIG. 12 shows an example of relationships between the GUI and operation buttons in the imaging device 1.

To change the start point, function buttons 110 and 108 may be used to move the start point leftward and rightward, the zoom lever 103 may be operated leftward and rightward to set the end point and thus the synthesizing range, and function buttons 107 and 109 may be used to adjust the brightness of the whole image. FIG. 12 shows these buttons and corresponding operations. The arrangement of the buttons linked to the directions of the operations on the GUI enable instinctive operations to be performed. In the present embodiment, the aforesaid buttons are used to adjust the start and end points, brightness and the gain. However, not limited to these buttons, other buttons may be used to produce such effects of the present embodiment.

A still image generated in the editing mode (namely, a synthesized image) is stored in a sub-folder "xxxx" under the DCIM folder shown in FIG. 9 as a piece of still image data. Note that a shutter speed after the synthesizing is embedded as the shutter speed into the header information such as the EXIF information that is attached to the image data when the image is shot by a digital camera. For example, "$\frac{1}{25}$s" is embedded as the shutter speed into the header information when the synthesized image is generated by synthesizing four images shot in the continuous shooting mode at the speed of 100 frames per second.

The following describes the editing processing unit 381 and the second writing unit 382 included in the second processing unit 362.

(2-1) Editing Processing Unit 381

The editing processing unit 381 includes an instruction receiving unit 391, a searching unit 392, a parameter updating unit 393, a synthesizing unit 394, and an output control unit 395.

(Instruction Receiving Unit 391)

When, with an intention to create a slow shutter image by synthesizing continuously shot images, the user sets the mode to the editing mode by using the mode dial shown in FIG. 4 or the mode setting menu M100 shown in FIG. 5, the instruction receiving unit 391 outputs an editing mode start instruction to the searching unit 392.

The instruction receiving unit 391, when the user selects a continuously shot image data group as the editing target, outputs an initialization instruction to the parameter updating unit 393, where the initialization instruction instructs to initialize various parameters such as those indicating the synthesizing start position, synthesizing end position, and the number of images to be synthesized. Also, the instruction receiving unit 391 outputs a piece of continuous shooting mode identification information that corresponds to the selected continuously shot image data group, to the synthesizing unit 394.

The instruction receiving unit 391, upon receiving a change request from the user on the editing screen, outputs the received change request to the parameter updating unit 393.

The instruction receiving unit 391, when the user presses the menu/enter button 112 on the editing screen, outputs a write instruction to the second writing unit 382.

(Searching Unit 392)

The searching unit 392, upon receiving the editing mode start instruction from the instruction receiving unit 391, searches the memory card 306 for the data shot in the continuous shooting mode, with use of the continuous shooting mode identification information. More specifically, the searching unit 392 searches a directory for the data. Here, the directory indicates a location where the data shot in the continuous shooting mode is stored. For example, the directory is composed of the continuous shooting folder "yyyy" and the sub-folders "zzz001" and "zzz002" included in the folder "yyyy", as shown in FIG. 9. That is to say, the continuous shooting mode identification information and the directory are the same.

The searching unit 392 displays a list of only the images shot in the continuous shooting mode on the GUI screen on the liquid crystal monitor 115.

(Parameter Updating Unit 393)

The parameter updating unit 393, upon receiving the initialization instruction, sets the parameters to the initial values. For example, the initial value of the parameters indicating the start position and the end position are respectively set to "1" (indicating a piece of image data representing the first image of the continuously shot images), and the initial value of the parameter indicating the number of images to be synthesized is set to "1" indicating one.

The parameter updating unit 393, upon receiving the change request, updates the change-target parameter based on the received change request, and outputs an update completion notification indicating that the parameter has been updated, to the synthesizing unit 394.

In so doing, the parameter updating unit 393, upon receiving a change request requesting a change of the number of images to be synthesized, updates the number of pieces of still image data (the number of still images) that are to be used to generate the synthesized image data, and calculates the shutter speed of the synthesized image that is to be generated by synthesizing the updated number of images. The parameter updating unit 393 updates the value of the shutter speed after the synthesizing in the indicator 503 displayed on the editing screen, to the calculated value. The shutter speed after the synthesizing is obtained by calculating, for example, "(shutter speed at continuous shooting)×(number of still images synthesized)".

(Synthesizing Unit 394)

The synthesizing unit 394, upon receiving the continuous shooting mode identification information from the instruction receiving unit 391, generates synthesized image data from one or more pieces of continuously shot image data, based on the parameters set by the parameter updating unit 393. The synthesizing unit 394 temporarily stores the generated synthesized image data into the DRAM 310.

The synthesizing unit 394, upon receiving the update completion notification from the parameter updating unit 393, re-generates the synthesized image data based on the parameters which have been updated by the parameter updating unit 393. The synthesizing unit 394 replaces the synthesized image data temporarily stored in the DRAM 310 with the synthesized image data after update (re-generated synthesized image data).

Note that when the synthesizing unit 394 stores the generated (re-generated) synthesized image data into the DRAM 310, the synthesizing unit 394 also updates the contents (the shutter speed and so on) of the header information such as the EXIF information so that the synthesized image data with the updated header information is stored.

In the following, the operation of the synthesizing unit 394 is described in detail.

The synthesizing unit 394 prestores Equation 1.

$$P'(x, y) = \beta(x, y) \frac{\sum_{i=a}^{b} \alpha_i(x, y) P_i(x, y)}{(b - a + 1)}$$ [Equation 1]

Equation 1 represents a calculation performed in the synthesizing process. In Equation 1, "P'(x,y)" represents a pixel value at the coordinate (x,y) of the synthesized image, "Pi(x,y)" represents a pixel value at the coordinate (x,y) of the $i^{th}$ continuously shot image in the continuously shot image data group, "αi(x,y)" represents a constant for adjustment of brightness (sensitivity) to be set for the pixel at the coordinate (x,y) of the $i^{th}$ continuously shot image, "β(x,y)" represents a constant for adjustment of brightness (sensitivity) to be set for the coordinate (x,y) of the synthesized image, "a" represents a continuous shooting number indicating the synthesizing start position in the continuously shot image data group, and "b" represents a continuous shooting number indicating the synthesizing end position in the continuously shot image data group.

Equation 1 represents the following: the target of the synthesizing is the $a^{th}$ through $b^{th}$ continuously shot images; for each pixel of the input $i^{th}$ continuously shot image, the constant αi(x,y) is accumulated; each pixel is multiplied by β(x, y) after the $a^{th}$ through $b^{th}$ continuously shot images are added; and the result is divided by (b−a+1) which indicates the number of images.

The synthesizing unit 394 generates synthesized image data by calculating the pixel values of all pixels (hereinafter referred to as synthesized pixels) that constitute the synthesized image, by repeatedly applying Equation 1 to the synthesized pixels.

Note that, when the output is average values of pixel values for each pixel constituting each of the continuously shot images, namely, in the case of the synthesizing mode A, the values of αi(x,y) and β(x,y) are all "1". Basically, when the gain of the whole image after synthesizing is to be adjusted (namely, in the case of the synthesizing mode B), β(x,y) is adjusted; and when the gain of each separate image is to be adjusted (in the case of the synthesizing mode C), αi(x,y) is adjusted.

Note that, to simplify the process, the values of αi(x,y) for the i$^{th}$ continuously shot image may be set to a same value, or the values of β(x,y) may be set to a same value. In this case, the following Equation 2 in which the constants are αi and β is used.

$$P'(x, y) = \beta \frac{\sum_{i=a}^{b} \alpha_i P_i(x, y)}{(b - a + 1)} \quad \text{[Equation 2]}$$

Figure 13:
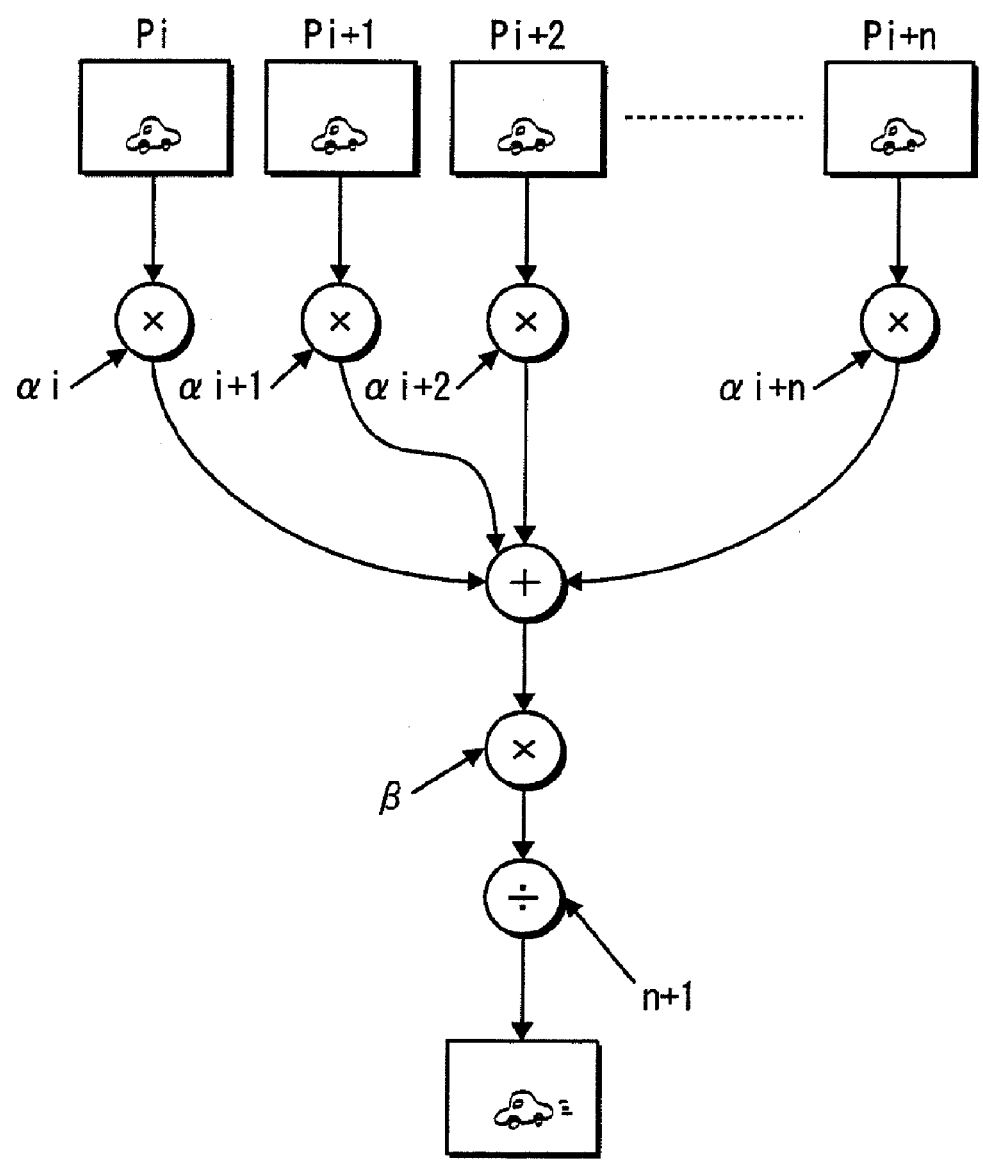
FIG. 13 schematically shows the calculation using Equation 2 in the synthesizing process in the imaging device 1.

FIG. 13 schematically shows the calculation of Equation 2. In this example, it is presumed that the i$^{th}$ image is specified as the synthesizing start position, and the (i+n)$^{th}$ image (the number of images to be synthesized being n+1) is specified as the synthesizing end position. First, each of pixels (pixel values) indicated by the coordinate (x,y) of each of the images Pi through (Pi+n) is multiplied by αi through (αi+n). Next, all results of αi×Pi through (αi+n×Pi+n) are added up, and the result is multiplied by β. The result is further divided by (n+1) which indicates the number of images to be synthesized. This generates the pixel indicated by the coordinate (x,y) of the synthesized image.

As is the case with Equation 1, the synthesizing unit 394 generates synthesized image data by calculating the pixel values of all pixels (hereinafter referred to as synthesized pixels) that constitute the synthesized image, by repeatedly applying Equation 2 to the synthesized pixels.

In the synthesizing process using Equation 1, it is possible to perform the synthesizing differently onto a specific object and onto the remaining portion of the image, by, for example, further adopting the object detection technology as well and changing the value of αi(x,y) with respect to only a specific area of each image to be synthesized. This makes it possible to obtain a synthesized image in which only a moving object has the effect of the flash motion.

Also, when the values of αi and β are set to be the same through the whole image, it is possible to correct the exposure for each image, or it is possible to correct the exposure after the synthesizing. This makes it possible to generate a synthesized image having a desired brightness from a plurality of continuously shot images in which the light source, such as a firework, moves at a high speed, and which, if synthesized normally, would result in a dark synthesized image.

The synthesizing unit 394 can generate one piece of synthesized image data from one or more pieces of still image data. In other words, the synthesizing unit 394 can generate one synthesized image from one or more still images.

(Output Control Unit 395)

The output control unit 395 displays, on the liquid crystal monitor 115 as a preview, a synthesized image that is generated from the synthesized image data stored in the DRAM 310.

(2-2) Second Writing Unit 382

The second writing unit 382, upon receiving the write instruction from the editing processing unit 381, causes the compression/extension circuit 305 to compress the synthesized image data stored in the DRAM 310, and writes the compressed synthesized image data into a predetermined folder (in this example, sub-folder "xxxx") in the memory card 306.

1.3 Operation of Imaging Device 1

The following describes the operation of the imaging device 1.

(1) Basic Operation

Now, a description is given of the processes of the basic operations of the imaging device 1, such as the focus/exposure determining process, still image shooting process, and reproducing (preview) process.

Note that, since these processes are known, they will be described briefly.

<Focus/Exposure Determining Process>

The focus/exposure determining process is a process that is explicitly performed when the shutter button 102 is half-pressed by the user, and is performed continuously during a preview on the liquid crystal monitor 115 or the like.

In the focus/exposure determining process, the data input from the imaging element 302 is analyzed by the DSP 304, and based on the result of the analysis, the CPU 309 drives the aperture and shutter driver 311 to adjust the exposure, and drives the focus driver 313 to adjust the focal length.

After the adjustments, data is input from the imaging element 302 again, the data is analyzed by the DSP 304, and based on the result of the analysis, the aperture and focus are re-adjusted. Here; since the exposure is determined by the aperture and the shutter speed, the following should be noted. That is to say, for example, when the aperture and the sensitivity have been fixed by the user operation, the exposure is determined only by changing the shutter speed; and when the shutter speed has been fixed, the exposure is determined only by adjusting the aperture. Also, when the focus and exposure fixing button 106 is pressed, the current settings of the focus and exposure are fixed and continued to be fixed until the fixing of the focus and exposure is released.

<Still Image Shooting Process>

If the focus and exposure have not been determined when the shutter button 102 is pressed by the user, the focus/exposure determining process is performed.

After the focus and exposure are determined, the image data, which is input from the imaging element 302 via the front end 303, is processed by the DSP 304. The processing performed by the DSP 304 includes converting the raw image information, which is arranged by the Bayer arrangement or the like in the imaging element, into the image data in the color space such as the RGB or YCbCr color space, correcting the flaw of the imaging element, the white balance correction, the distortion correction, the edge enhancement, and the color correction.

The image data having been processed by the DSP 304 is compressed by the compression/extension circuit 305 and is recorded into the memory card 306. Note that, when the image data is compressed and recorded, the information set for the shooting, such as the shutter speed, exposure, focal length, and whether or not to use the flash bulb, is also recorded.

Also, when the raw data of the imaging element 302 is specified as the image data recording format, the above-described processing by the DSP 304 is omitted, and the raw data output from the imaging element 302, merely attached with the information set for the shooting, is recorded into the memory card 306. Note that, since the data held by the imaging element 302 is large in size, the data may be compressed by the lossless compression such as the Huffman compression before it is recorded into the memory card 306.

<Reproducing (Preview) Process>

The reproducing process is a process for displaying the image, which is represented by the image data recorded on the memory card 306, on the liquid crystal monitor 115.

When the user sets the mode to the reproducing mode, the imaging device 1 reads out the still image data from the memory card 306, causes the compression/extension circuit 305 to extend the still image data, causes the DSP 304 to reduce the extended image data, and displays the image represented by the image data on the liquid crystal monitor 115.

When the user presses the function button 108 or 109, the imaging device 1 reads out the next or previous still image data from the memory card 306, extend and reduces the still image data, and displays the image represented by the image data on the liquid crystal monitor 115.

When the user presses the cancel and delete button 113 at this point in time, the imaging device 1 displays, on the liquid crystal monitor 115, a dialog asking the user if the displayed image should be deleted. When the user presses the menu/enter button 112 in response to this, the imaging device 1 deletes the still image data representing the currently displayed still image, from the memory card 306.

Also, when the zoom lever 103 is operated during the display, the displayed image is enlarged or reduced. Note that, during the display of an enlarged image, only part thereof is displayed, and the function buttons 107 to 110 can be used to move the displayed part upward, downward, leftward, and rightward in the image.

(2) Continuous Shooting Process

Here, the continuous shooting process in the continuous shooting mode will be described with reference to the flowchart shown in FIG. 14.

The speed setting unit 373 checks whether or not the continuous shooting speed setting is requested by the user (step S5).

When it judges that the continuous shooting speed setting is requested (Yes in step S5), the speed setting unit 373 displays a GUI screen for setting the speed as shown in FIG. 7 on the liquid crystal monitor, and performs the setting of the continuous shooting speed (step S10). More specifically, the speed setting unit 373 changes (updates) the continuous shooting speed that is temporarily stored in the DRAM 310, to the continuous shooting speed that is received from the user. The user inputs the continuous shooting speed setting request by, for example, pressing the function button 111 in the continuous shooting mode. Note that the user can change the continuous shooting speed on the menu that is displayed when the menu/enter button 112 is pressed.

When it is judged that the continuous shooting speed setting is not requested (No in step S5), the setting unit 375 checks whether or not the shutter button 102 is pressed or half-pressed (step S15).

When it is judged that the shutter button 102 is not pressed (No in step S15), the control returns to step S5. As understood from this, until the shutter button 102 is pressed, the imaging device waits in the state where it can set the continuous shooting speed.

When it is judged that the shutter button 102 is pressed or half-pressed (Yes in step S15), the setting unit 375 performs the focus setting and the aperture setting (steps S20 and S25).

The identification information generating unit 377 judges whether or not the shutter button 102 is pressed (step S30).

When it judges that the shutter button 102 is not pressed (No in step S30), the identification information generating unit 377 judges whether or not the shutter button 102 is half-pressed (step S35). When it judges that the shutter button 102 is half-pressed (Yes in step S35), the control returns to step S30. When it judges that the shutter button 102 is not half-pressed (Not in step S35), the control returns to step S5.

When it judges that the shutter button 102 is pressed (Yes in step S30), the identification information generating unit 377 generates the continuous shooting mode identification information.

More specifically, the identification information generating unit 377 judges whether or not the folder "yyyy" is present (step S40). When it judges that the folder "yyyy" is not present (No in step S40), the identification information generating unit 377 generates the folder "yyyy" (step S45), and then generates the sub-folder "zzz00n" (step S50). When it judges that the folder "yyyy" is present (Yes in step S40), the identification information generating unit 377 generates the sub-folder "zzz00n" (step S50).

The identification information generating unit 377 generates an information file, and writes the generated information file under the sub-folder, namely, the continuous shooting mode identification information generated by the current settings in the continuous shooting mode (step S55).

The imaging unit 351 and the first writing unit 372 generate image data (continuously shot image data) based on the continuous shooting speed having been set, and the focal length and the exposure determined by the setting unit 375 (step S60), compresses the generated image data (step S65), and writes the compressed image data into the sub-folder generated by the identification information generating unit 377 (step S70).

The repeat control unit 376 judges whether or not the shutter button 102 is being pressed (step S75). In other words, the repeat control unit 376 judges whether or not the instruction for performing the continuous shooting is being received from the shutter button 102.

When the repeat control unit 376 judges that the shutter button 102 is being pressed (Yes in step S75), the control returns to step S55. That is to say, when the repeat control unit 376 judges that the instruction for performing the continuous shooting is being received from the shutter button 102, the control returns to step S55.

When the repeat control unit 376 judges that the shutter button 102 is not being pressed, namely, that the user has released the shutter button 102 (No in step S75), the process ends. That is to say, when the repeat control unit 376 judges that the instruction for performing the continuous shooting has not been received (detected), the repeat control unit 376 ends the process, and the device enters the state in which it waits for a new instruction (for example, pressing of the shutter for performing the mode change or the next continuous shooting).

The shooting speed of the image data taken from the imaging element 302 corresponds to the value having been set as the continuous shooting speed. For example, when the continuous shooting speed is 180 frames per second, 180 frames of image data are recorded per second into the memory card 306.

As described above, in the continuous shooting mode, while the shutter is being pressed, the image data taken from the imaging element 302 is recorded as the continuously shot image data onto the detachable memory card 306.

(3) Editing Process

Here, the editing process in the editing mode will be described with reference to the flowchart shown in FIG. 15.

In the editing mode, the imaging device 1 reads out the data shot in the continuous shooting mode from the memory card 306, by using the continuous shooting mode identification information, and displays the read-out data as a list.

The instruction receiving unit 391 receives, from the user, a selection of the continuously shot image data group, which is selected as the editing target (step S100).

The parameter updating unit 393 initializes parameters indicating the synthesizing start position, synthesizing end position, the number of images to be synthesized and the like (step S105).

The synthesizing unit 394 performs the synthesizing process based on the values of the various parameters having been set (step S110). More specifically, the synthesizing unit 394 generates synthesized image data from one or more pieces of continuously shot image data that are targeted to be synthesized, based on the values of the various parameters having been set.

The synthesizing unit 394 displays the synthesized image formed by the generated synthesized image data, as a preview (step S115).

The instruction receiving unit 391 enters the wait state in which it waits for an instruction from the user (step S120).

The instruction receiving unit 391 judges whether or not a received instruction is the start position change request (step S125). When it is judged that the received instruction is the start position change request (Yes in step S125), the parameter updating unit 393 updates the start position (step S130), and returns to step S110.

When it is judged that the received instruction is not the start position change request (No in step S125), the instruction receiving unit 391 judges whether or not the received instruction is the shutter speed change instruction, namely, the end position change request (step S135). When it is judged that the received instruction is the shutter speed change instruction (Yes in step S135), the parameter updating unit 393 updates the number of pieces of continuously shot image data (namely, the number of continuously shot images) to be used in the synthesizing process (step S140), and returns to step S110. In so doing, the parameter updating unit 393 calculates the shutter speed of the synthesized image based on the updated number. The parameter updating unit 393 updates the shutter speed after the synthesizing that is displayed on the editing screen, to the calculated shutter speed.

When it is judged that the received instruction is not the shutter speed change instruction (No in step S135), the instruction receiving unit 391 judges whether or not the received instruction is the brightness change instruction (step S145). When it is judged that the received instruction is the brightness change instruction (Yes in step S145), the parameter updating unit 393 updates the constant $\beta(x,y)$ in Equation 1 to be used in the synthesizing process (step S150), and returns to step S110.

When it is judged that the received instruction is not the brightness change instruction (No in step S145), the instruction receiving unit 391 judges whether or not the received instruction is the exposure change instruction (step S155). When it is judged that the received instruction is the exposure change instruction (Yes in step S155), the parameter updating unit 393 updates the constants $\alpha i(x,y)$ and $\beta(x,y)$ in Equation 1 to be used in the synthesizing process (step S160), and returns to step S110.

When it is judged that the received instruction is not the exposure change instruction (No in step S155), the instruction receiving unit 391 judges whether or not the received instruction is the OK instruction which is input by the user by pressing the menu/enter button 112 (step S165).

When it is judged that the received instruction is the OK instruction (Yes in step S165), the second writing unit 382 causes the compression/extension circuit 305 to compress the generated synthesized image data, and stores (writes) the compressed synthesized image data into a predetermined folder (in this example, sub-folder "xxxx") in the memory card 306 (step S175).

When it is judged that the received instruction is not the OK instruction (No in step S165), the control returns to step S125.

This completes the description of the flow of the editing process in the editing mode.

1.4 Modifications of Embodiment 1

Up to now, the present invention has been described through Embodiment 1. However, the present invention is not limited to the embodiment, but includes, for example, the following modifications.

(1) In the above-described Embodiment 1, the editing process is performed only when the mode is switched to the editing mode. However, the present invention is not limited to this.

When the continuously shot image data is selected in the reproducing mode, the editing process may be performed in accordance with the instruction of the user.

Here, the operation of the imaging device in this case will be described.

In the reproducing mode, the imaging device displays a list of all the still images, video images, and continuously shot images shot by the imaging device. When the user selects a still image from the list, the imaging device displays the selected still image on the liquid crystal screen as a preview. The imaging device may enlarge or reduce the image according to the user operation, and move the display range to a desired portion when the still image is larger than the display screen in size.

Also, when the user selects a video image from the list, the imaging device reproduces the selected video image. In the reproduction, operations such as pause, rewinding, and fast forward are available to the user.

When the user selects the continuously shot image data from the list, the imaging device displays a menu for the user to select whether to reproduce or edit the continuously shot image data. When the user selects to reproduce, the imaging device reproduces each image constituting the continuously shot image data group including the selected continuously shot image data, as a video. And when the user selects to edit, the imaging device switches to the editing mode, generates synthesized image data from the continuously shot image data group including the selected continuously shot image data, and displays a synthesized image that is represented by the generated synthesized image data, on the GUI screen for editing shown in FIG. 11. Note that the continuously shot image data is identified by the continuous shooting mode identification information.

This enables the user to enter directly into the synthesizing process when the user wants to edit, without displaying the list in the editing mode as shown in FIG. 10.

(2) In the above-described Embodiment 1, the continuous shooting mode identification information is recorded into the memory card 306, where the continuous shooting mode identification information is composed of the names of folder and sub-folders storing the continuously shot image data, and the folder and sub-folders are generated. However, the present invention is not limited to this.

For example, when a plurality of images shot in the continuous shooting mode are all still images, tag information for identifying the continuous shooting mode may be written to the header of each piece of continuously shot image data, and the tag information written in the header may be used as the continuous shooting mode identification information.

Figure 16:
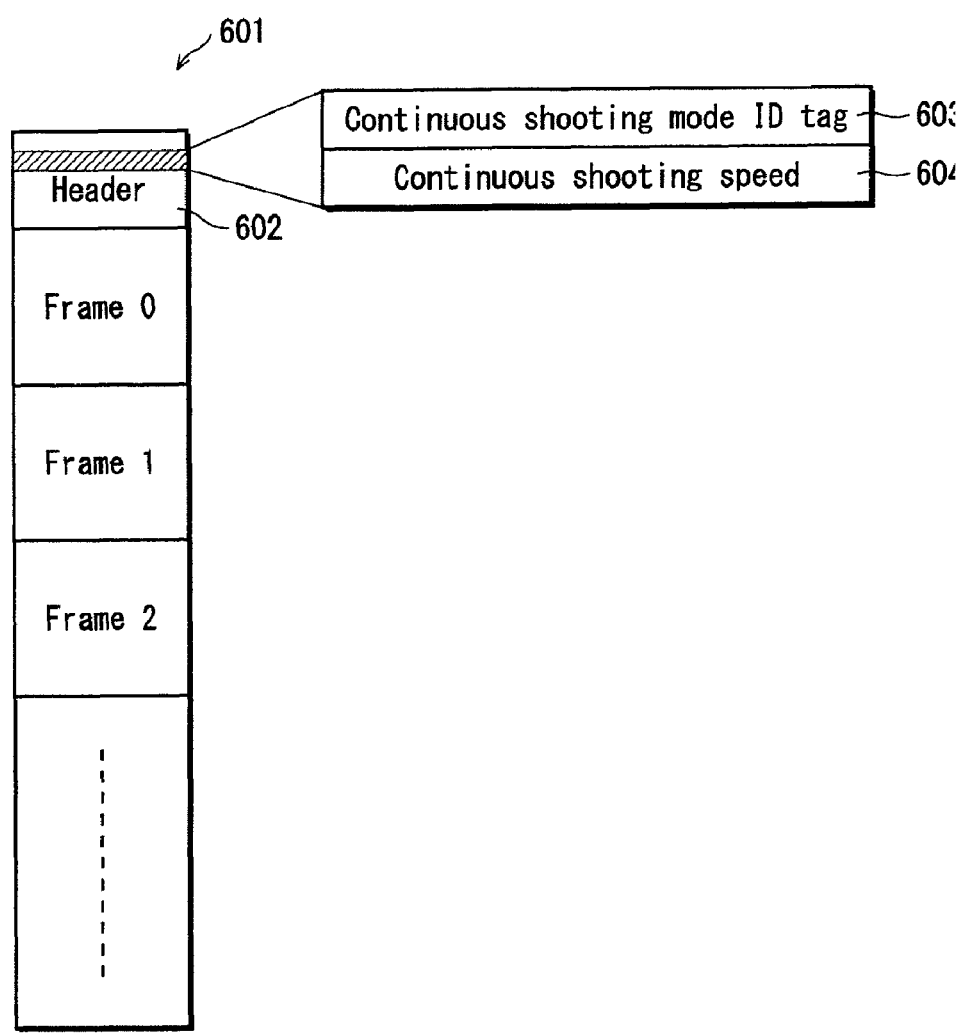
FIG. 16 shows an example of the data structure of the video stream data 601.

Also, when the continuously shot image data shot in the continuous shooting mode is video stream data conforming to Motion JPEG, MPEG-1, MPEG-2, MPEG-4, H.261, H.264 or the like, tag information for identifying the continuous shooting mode may be written to the header of each piece of video stream data, and the tag information written in the header may be used as the continuous shooting mode identification information. FIG. 16 shows one example of video stream data 601 shot in the continuous shooting mode. As shown in FIG. 16, a continuous shooting mode ID tag 603 and a continuous shooting speed 604, which is used as the shooting information, are embedded into a header 602 of the video stream data 601.

Here, the tag information is, for example, information (for example, with the bit value "1") indicating that the image data or stream data in which the tag information is embedded was shot in the continuous shooting mode.

Alternatively, the continuous shooting mode identification information may be included in the information file.

In either case, the data of images shot in the continuous shooting mode can be distinguished from the data of images shot in other shooting modes. This makes it possible to distinguish the shooting data of the continuous shooting mode that can be edited in the editing mode as will be described later, from the other shooting data.

(3) The above-described embodiment and modifications may be combined in various ways.

1.5 Summary of Embodiment 1

As described above, in the editing mode of Embodiment 1, a plurality of pieces of image data, which were shot in the continuous shooting mode and recorded in the memory card 306, are displayed as a list, and the user can select a desired range of image data from the displayed list of image data, and can edit the selected range of image data to generate a slow shutter image, and store the slow shutter image as a still image.

Figure 17:
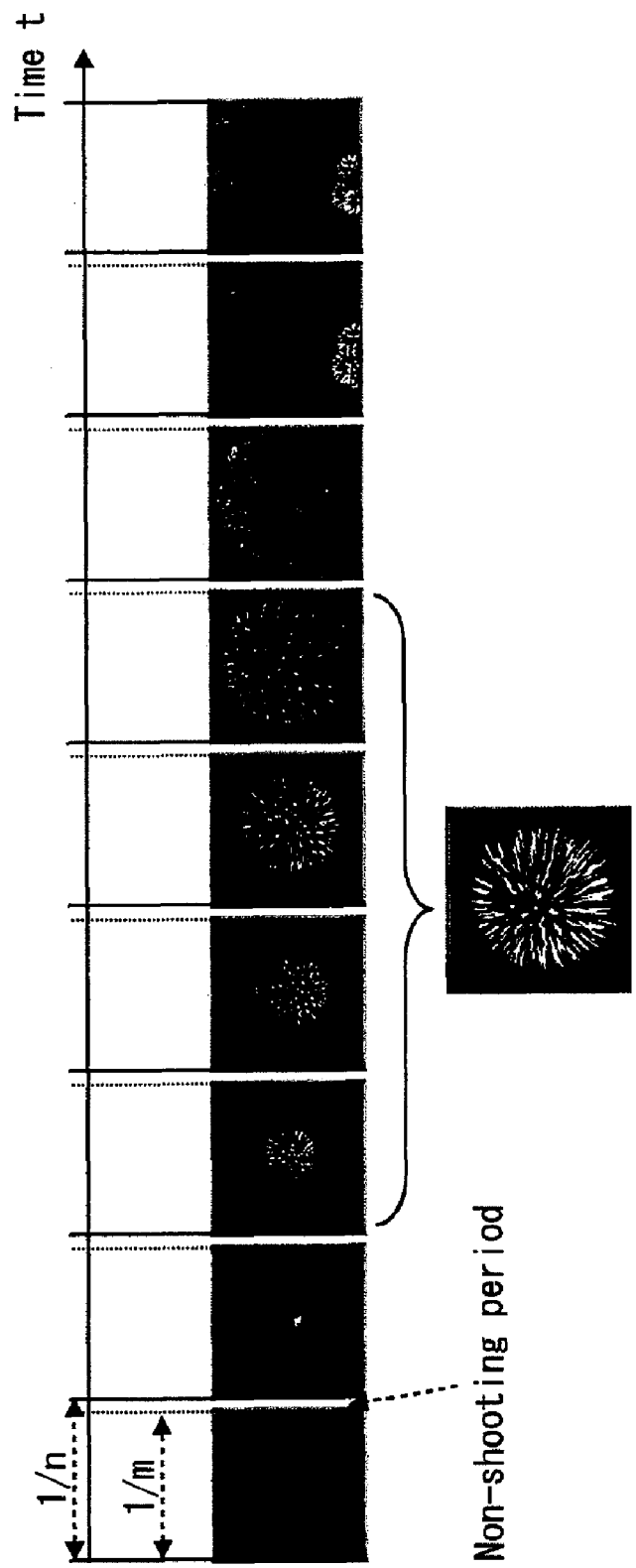
FIG. 17 shows an example case where continuously shot images of a firework are synthesized in the imaging device 1.

FIG. 17 shows an example case where a slow shutter image of a firework is generated by synthesizing part of photographed images of the firework continuously shot at a high speed. As shown in FIG. 17, the images were shot continuously at a speed of n frames per second, and at the shutter speed of 1/m. When the difference between 1/n and 1/m is small enough, the non-shooting period can be neglected. Therefore, a synthesized image that is equivalent to an image shot at a shutter speed slower than 1/n can be generated by synthesizing the continuously shot images. Also, since it is possible to change the synthesizing start position and the range freely, it is possible to shoot without fail an image, like that of a firework, for which it is difficult to press the shutter at the right timing and difficult to set the shutter speed.

Further, with the structures that the continuously shot image data is stored into the memory card in the continuous shooting mode, and that the slow shutter image is generated from continuously shot images in the editing mode that can be activated arbitrarily, the following advantageous effects are produced: (1) a slow shutter image can be generated later after the shooting, and the user can concentrate on the shooting; and (2) since the continuously shot image data is stored in the memory card, the editing can be made as many times as necessary until a satisfactory image is generated.

Especially, with the structure that the continuously shot image data is stored in the memory card in an identifiable state, it is possible to select only the continuously shot image data as the target of the editing in the editing mode. This improves the operability of the user. Also, with the structure that the continuously shot image data is stored in the memory card in an identifiable state, it is possible to read the data from the memory card into a personal computer, and edit the data on the personal computer in the editing mode.

Here, the following are to be noted. The control unit in the present invention corresponds to the first processing unit 361. Especially, among the functions of the control unit, the process of storing sequentially into the recording medium a plurality of pieces of still image data which are obtained by the continuous shooting corresponds to the repeat control unit 376. Also, the process of, upon receiving the instruction to start generating a synthesized image, controlling the editing unit to generate a synthesized image using two or more pieces of still image data recorded in the recording medium corresponds to the operation of the instruction receiving unit 391 for receiving the editing mode start instruction, namely, the operation for starting the editing.

2. Embodiment 2

Embodiment 2, in addition to the functions of the imaging device 1 in Embodiment 1, further includes a function to generate a slow shutter image with an appropriate exposure when each continuously shot image shot at a high continuous shooting speed is short of exposure.

An imaging device 2 in Embodiment 2 generates an information file that contains shooting information that is composed of a continuous shooting speed and exposure information that is set at a start of the continuous shooting.

In this example, the exposure information is information (a value) when the appropriate exposure is normalized to "1.0", and the exposure information takes a value greater than "1.0" when the exposure is "over", and takes a value smaller than "1.0" when the exposure is "under". For example, when the exposure is short and the image is half the brightness at the appropriate exposure, the exposure information takes a value "0.5".

In the following, description will be omitted as to the same portions as those in Embodiment 1, and the differences from Embodiment 1 and the effects brought thereby will be described. Note that the imaging device 2 includes the same structural elements as those in Embodiment 1, and they have the same reference signs as those in Embodiment 1.

2.1 Structure of Imaging Device 2

Figure 18:
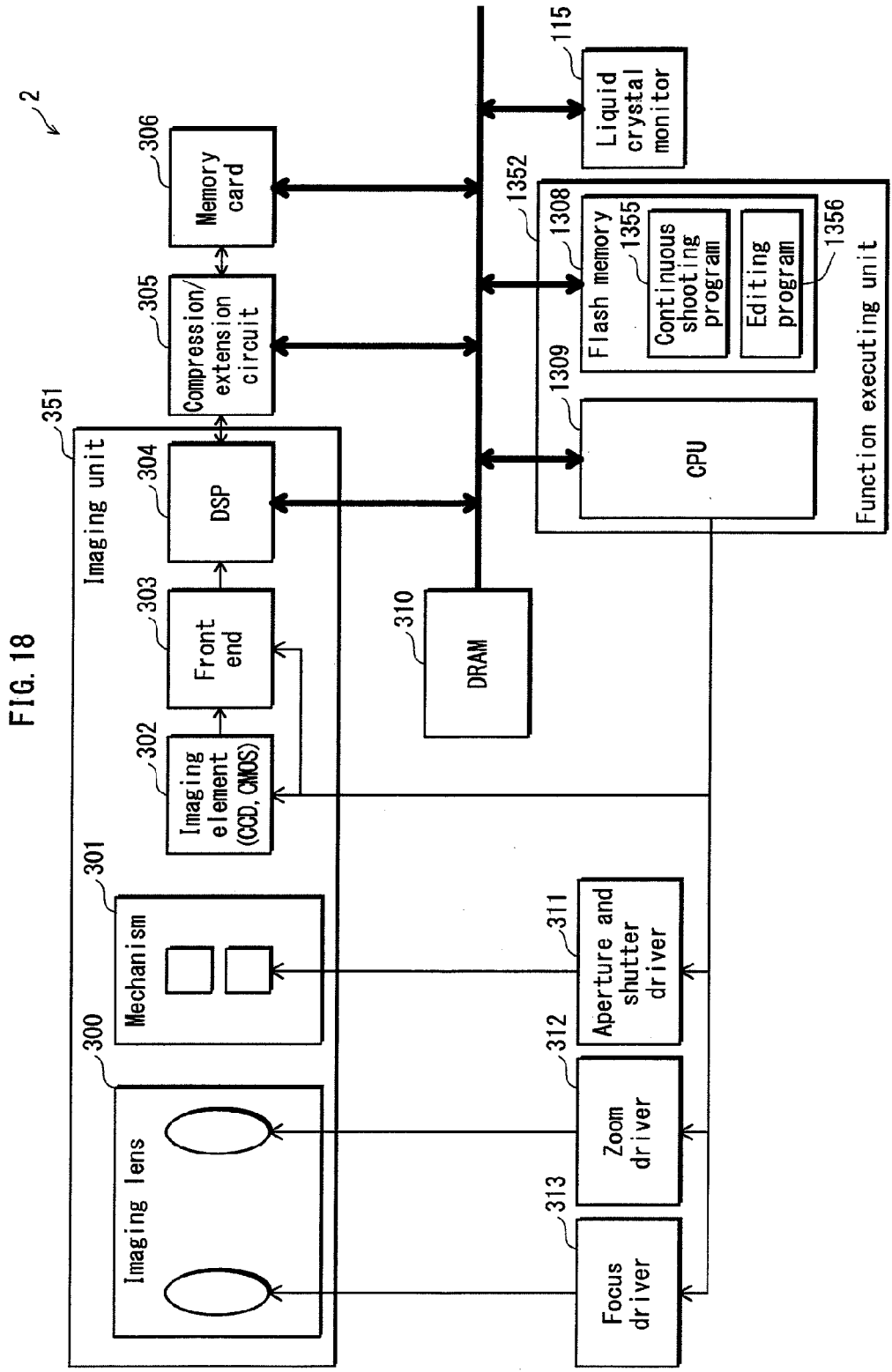
FIG. 18 is a block diagram showing the structure of the imaging device 2.

The imaging device 2, as shown in FIG. 18, includes the imaging unit 351, a function executing unit 1352, the compression/extension circuit 305, the memory card (secondary storage medium) 306, the liquid crystal monitor 115, the DRAM 310, the aperture and shutter driver 311, the zoom driver 312, and the focus driver 313 for performing the focus control.

Now, a description is given of the function executing unit 1352 which is different from the corresponding one in Embodiment 1.

The function executing unit 1352 includes a flash memory 1308 and a CPU 1309, where programs are stored in the flash memory 1308 and the CPU 1309 controls the whole system.

Here, as in Embodiment 1, the operation of the function executing unit 1352 in the shooting process in the continuous shooting mode and in the synthesizing process in the editing mode will be described.

The flash memory 1308, as shown in FIG. 18, includes a continuous shooting program 1355 and an editing program 1356.

The continuous shooting program 1355 performs the shooting process in the continuous shooting mode.

The editing program 1356 performs the process of generating one synthesized image by performing the synthesizing process onto one or more continuously shot images. Note that, when one synthesized image is generated from one image, the synthesized image is the same as the image before the synthesizing process.

Note also that each program includes data to be used by the program itself, as well as the code that indicates the operation content.

The CPU 1309 realizes the functions of the function executing unit 1352 by cooperating with other constitutional elements by using the continuous shooting program 1355 and the editing program 1356.

Figure 19:
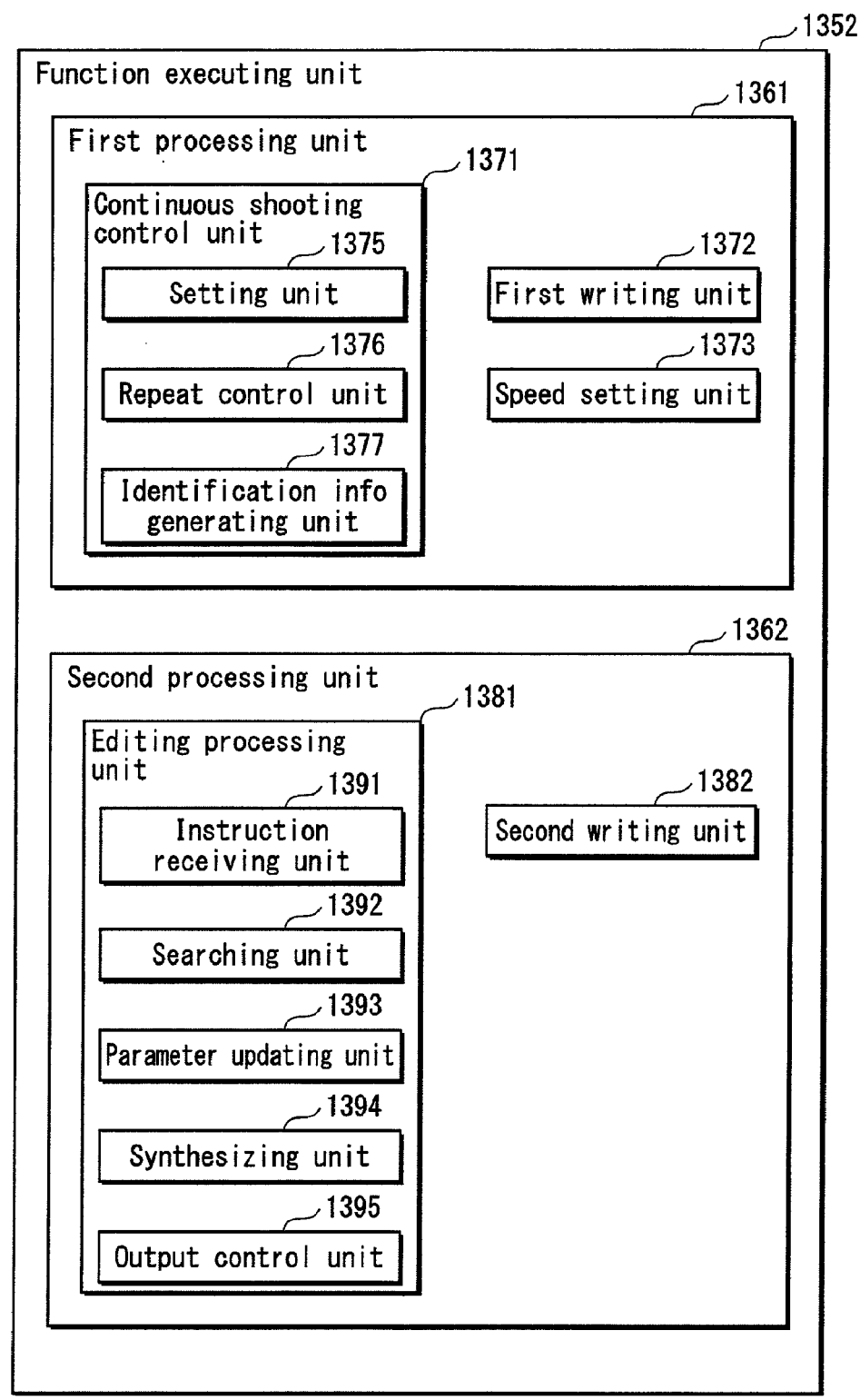
FIG. 19 is a block diagram showing the structure of the function executing unit 1352.

The function executing unit 1352, as shown in FIG. 19, is composed of a first processing unit 1361 and a second processing unit 1362.

The first processing unit 1361 has a function that is realized when the CPU 1309 cooperates with other constitutional elements by using the continuous shooting program 1355.

The second processing unit 1362 has a function that is realized when the CPU 1309 cooperates with other constitutional elements by using the editing program 1356.

The CPU 1309 switches among functions by switching among programs to be activated, in accordance with an instruction from the user.

Specific examples of switching among functions are described in Embodiment 1, and description thereof is omitted here.

The following describes the first processing unit 1361 and the second processing unit 1362.

(1) First Processing Unit 1361

The first processing unit 1361 is composed of a continuous shooting control unit 1371, a first writing unit 1372, and a speed setting unit 1373.

The first writing unit 1372 and the speed setting unit 1373 are the same as the first writing unit 372 and the speed setting unit 373 in Embodiment 1, and description thereof is omitted here.

(1-1) Continuous Shooting Control Unit 1371

The continuous shooting control unit 1371 is composed of a setting unit 1375, a repeat control unit 1376, and an identification information generating unit 1377, and performs the control in relation to the continuous shooting.

When the shutter button is pressed in the continuous shooting mode, the continuous shooting control unit 1371 starts recording the image data (continuously shot image data) received from the imaging element 302.

The following describes details of the operation.

(Setting Unit 1375)

The setting unit 1375 is the same as the setting unit 375 described in Embodiment 1, and description thereof is omitted here.

(Identification Information Generating Unit 1377)

The identification information generating unit 1377, when the focal length and the exposure are determined by the setting unit 1375, generates continuous shooting mode identification information. In this example, as is the case with Embodiment 1, the continuous shooting mode identification information includes a name of a folder for storing the continuously shot images (continuously shot image data), and includes names of sub-folders that belong to the folder.

The identification information generating unit 1377, each time a shooting is performed in the continuous shooting mode, generates a sub-folder for storing the continuously shot image data individually.

The identification information generating unit 1377 generates an information file including shooting information, writes the generated information file under a sub-folder as a piece of continuous shooting mode identification information that is generated each time the a continuous shooting is set in the continuous shooting mode, and performs the initial setting of the memory card to store the continuously shot image data.

Note that the shooting information includes a shooting speed and exposure information determined by the setting unit 1375.

(Repeat Control Unit 1376)

The repeat control unit 1376, as is the case with the repeat control unit 376 in Embodiment 1, controls the operation of the imaging unit 351 and the first writing unit 1372 while the shutter button 102 is being pressed.

When the user releases the shutter button 102, the repeat control unit 1376 ends the recording of the image data (continuously shot image data) by stopping controlling the operation of the first writing unit 1372.

(2) Second Processing Unit 1362

The second processing unit 1362 is composed of an editing processing unit 1381 and a second writing unit 1382.

The second processing unit 1362 operates in the same manner as the second processing unit 362 in Embodiment 1, but is different therefrom in the equation to be used in the synthesizing.

In the following, the second processing unit 1362 will be described, centering on the differences from the second processing unit 362.

(2-1) Editing Processing Unit 1381

The editing processing unit 1381 includes an instruction receiving unit 1391, a searching unit 1392, a parameter updating unit 1393, a synthesizing unit 1394, and an output control unit 1395.

The instruction receiving unit 1391, searching unit 1392, parameter updating unit 1393, and output control unit 1395 are the same as the instruction receiving unit 391, searching unit 392, parameter updating unit 393, and output control unit 395 in Embodiment 1, and description thereof is omitted here.

The following describes the synthesizing unit 1394.

(Synthesizing Unit 1394)

The synthesizing unit 1394 prestores Equation 3 that is shown below.

The synthesizing unit 1394, upon receiving the continuous shooting mode identification information from the instruction receiving unit 1391, generates synthesized image data from one or more pieces of continuously shot image data, based on the parameters set by the parameter updating unit 1393 and the exposure information included in Equation 3 and the information file. The synthesizing unit 1394 temporarily stores the generated synthesized image data into the DRAM 310.

The synthesizing unit 1394, upon receiving the update completion notification from the parameter updating unit 1393, re-generates the synthesized image data based on the parameters which have been updated by the parameter updating unit 1393 and the exposure information included in Equation 3 and the information file. The synthesizing unit 1394 replaces the synthesized image data temporarily stored in the DRAM 310 with the synthesized image data after update (re-generated synthesized image data).

Note that when the synthesizing unit 1394 stores the generated (re-generated) synthesized image data into the DRAM 310, the synthesizing unit 1394 also updates the contents (the shutter speed and so on) of the header information such as the EXIF information so that the synthesized image data with the updated header information is stored.

$$P'(x, y) = \beta(x, y) \frac{\sum_{i=a}^{b} \alpha_i(x, y) P_i(x, y)}{\sum_{i=a}^{b} E_i} \quad \text{[Equation 3]}$$

Equation 3 is obtained by replacing "(b−a+1)" in Equation 1 with a calculation that uses the exposure information. In Equation 3, "Ei" represents exposure information associated with a piece of continuously shot image data attached with continuous shooting number "i" among the one or more pieces of continuously shot image data to be synthesized. Note that, since one piece of exposure information set at the start of the continuous shooting is used here, the one or more pieces of continuously shot image data to be synthesized are all associated with the same piece of exposure information, namely the same value.

With use of Equation 3, the exposure is adjusted to the appropriate exposure in correspondence with the number of images to be synthesized. For example, when all the exposure information of the continuously shot image data are "0.25(¼)": when one synthesized image data is generated by synthesizing one image, the brightness is set to four times; when one synthesized image data is generated by synthesizing two images, the brightness is set to two times; when one synthesized image data is generated by synthesizing three images, the brightness is set to 4/3 times; when one synthesized image data is generated by synthesizing four images, the brightness is set to one time; when one synthesized image data is generated by synthesizing five images, the brightness is set to 4/5 times; and when one synthesized image data is generated by synthesizing n images, the brightness is set to 4/n times.

Also, as is the case with Equations 1 and 2, the synthesizing unit 1394 generates synthesized image data by calculating the pixel values of all pixels (hereinafter referred to as synthesized pixels) that constitute the synthesized image, by repeatedly applying Equation 3 to the synthesized pixels.

As described above, the synthesizing unit 1394 can generate one piece of synthesized image data from one or more pieces of still image data. In other words, the synthesizing unit 1394 can generate one synthesized image from one or more still images.

(2-2) Second Writing Unit 1382

The second writing unit 1382 is the same as the second writing unit 382 described in Embodiment 1, and description thereof is omitted here.

2.2 Operation of Imaging Device 2

(1) Basic Operation

The focus/exposure determining process, still image shooting process, and reproducing (preview) process, which constitute the basic operation of the imaging device 2 are the same as those described in Embodiment 1, and description thereof is omitted here.

(2) Continuous Shooting Process

Here, with respect to the continuous shooting process in the continuous shooting mode, an operation unique to Embodiment 2 will be described with reference to the flowchart shown in FIG. 14.

Figure 14:
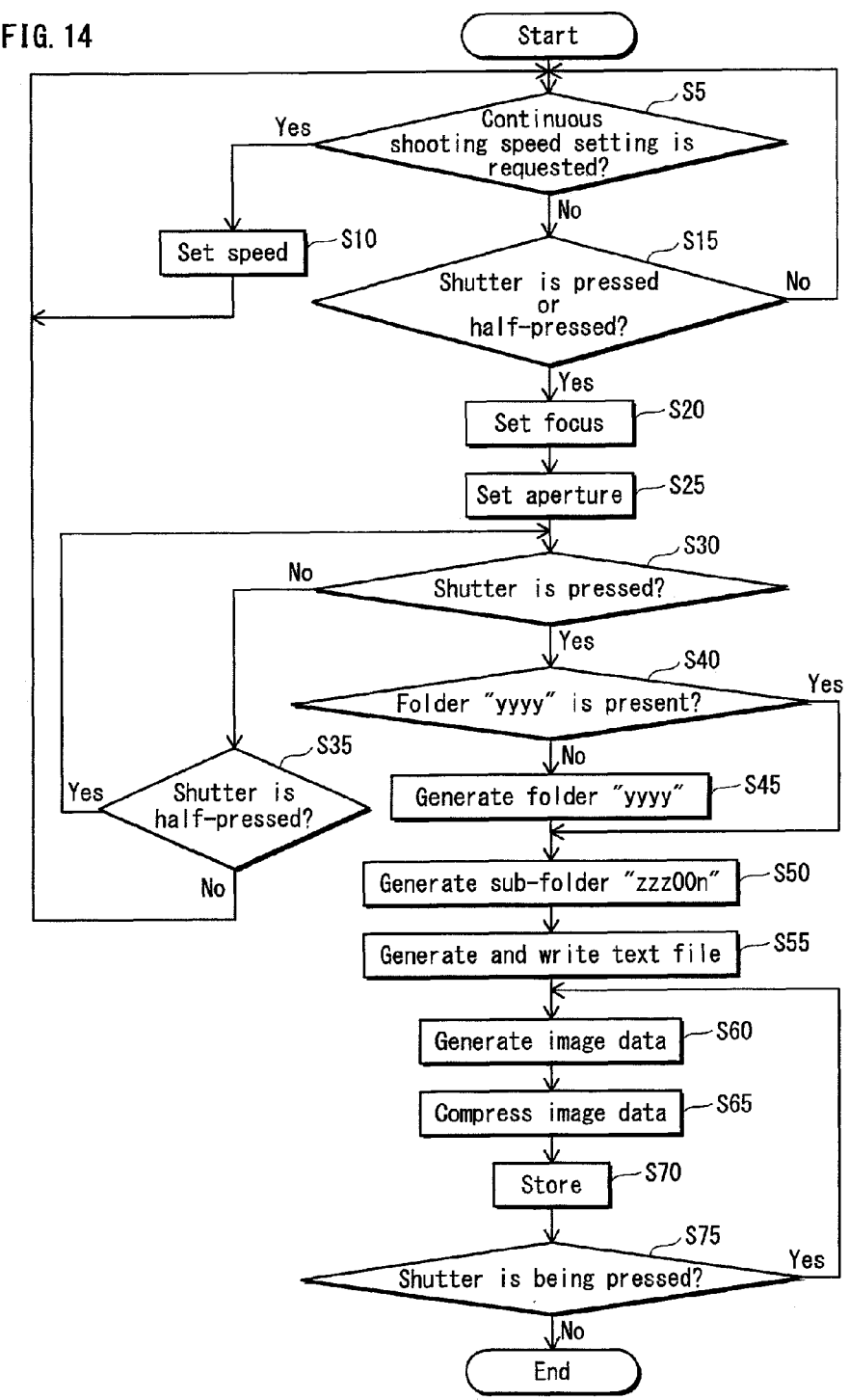
FIG. 14 is a flowchart of the continuous shooting process in the continuous shooting mode in the imaging device 1.

The operation unique to Embodiment 2 is the operation in step S55 shown in FIG. 14.

In step S55, the identification information generating unit 1377 of the imaging device 2 generates an information file including (i) information indicating that each image data was shot in the continuous shooting mode, (ii) the shooting speed, and (iii) the exposure information determined by the setting unit 1375, and writes the generated information file under a sub-folder as a piece of generated continuous shooting mode identification information.

(3) Editing Process

Here, with respect to the editing process in the editing mode, an operation unique to Embodiment 2 will be described with reference to the flowchart shown in FIG. 15.

Figure 15:
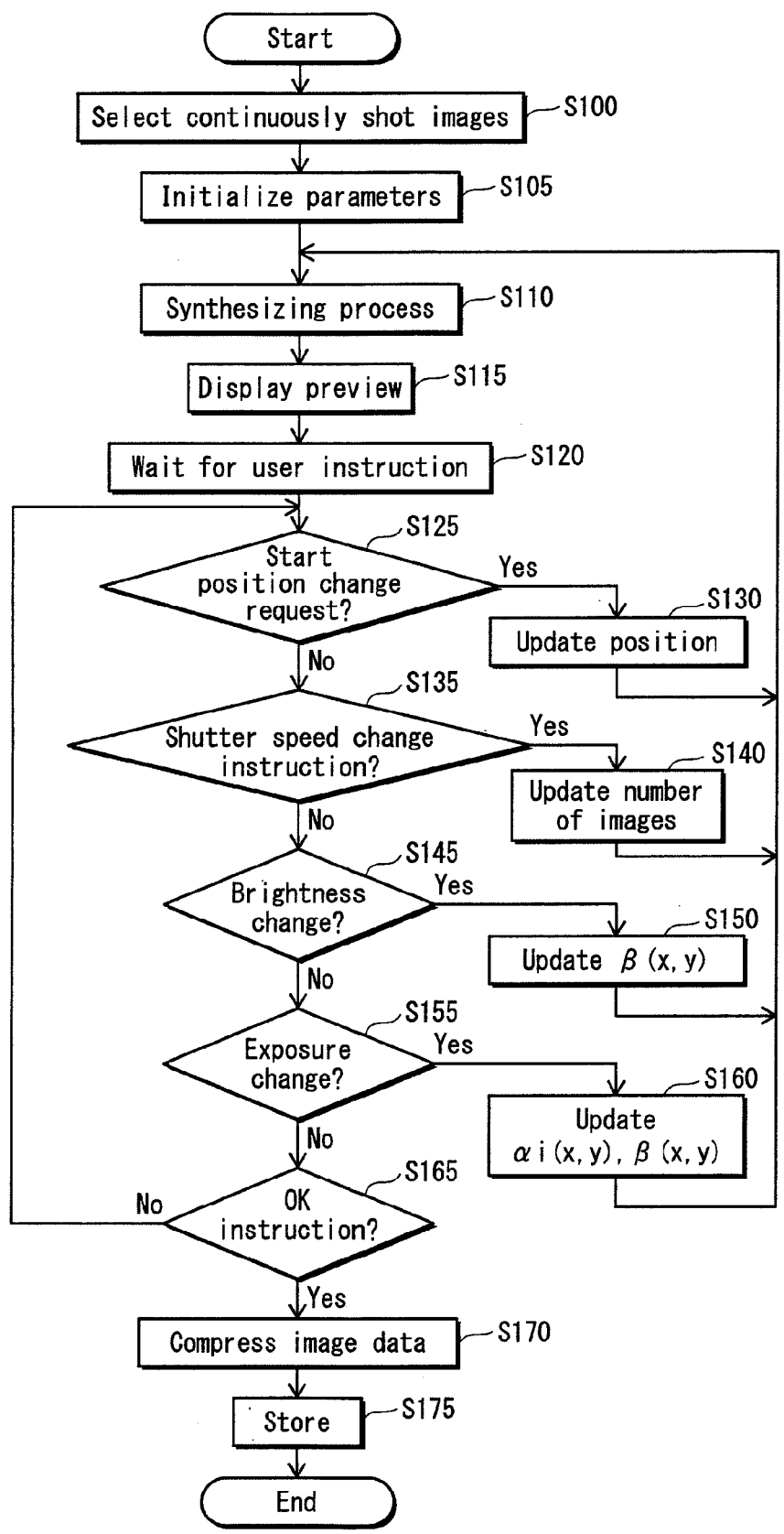
FIG. 15 is a flowchart of the editing process in the editing mode in the imaging device 1.

The operation unique to Embodiment 2 is the operation in step S110 shown in FIG. 15.

In step S110, the synthesizing unit 1394 of the imaging device 2 generates synthesized image data by using the parameters having been set by the parameter updating unit 1393 and the exposure information included in prestored Equation 3 and the information file.

2.3 Modifications of Embodiment 2

Up to now, the present invention has been described through Embodiment 2. However, the present invention is not limited to the embodiment, but includes, for example, the following modifications.

(1) In the above-described Embodiment 2, as is the case with the modification of Embodiment 1, when the continuously shot image data is selected in the reproducing mode, the editing process may be performed in accordance with the instruction of the user.

(2) In the above-described Embodiment 2, as is the case with Embodiment 1, the continuous shooting mode identification information is composed of the names of folder and sub-folders storing the continuously shot image data. However, the present invention is not limited to this.

As is the case with the modification of Embodiment 1, for example, when a plurality of images shot in the continuous shooting mode are all still images, tag information for identifying the continuous shooting mode may be written to the header of each piece of continuously shot image data, and the tag information written in the header may be used as the continuous shooting mode identification information.

Figure 20:
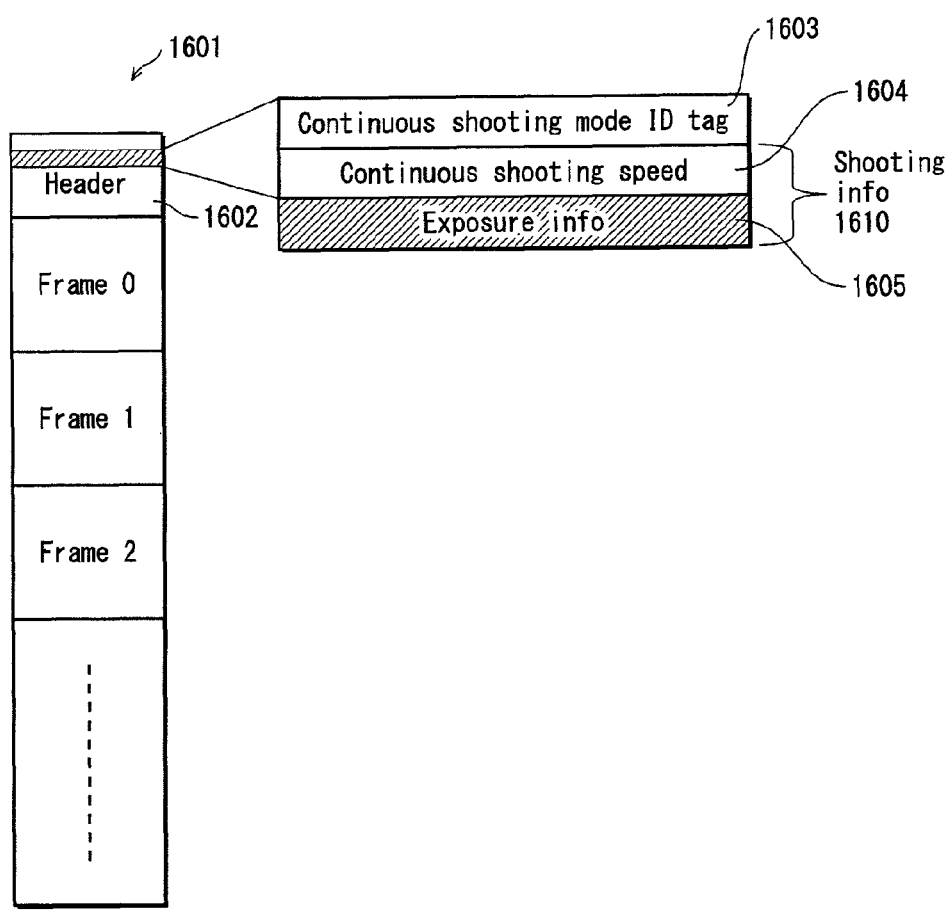
FIG. 20 shows an example of the data structure of the video stream data 1601.

Also, when the continuously shot image data shot in the continuous shooting mode is video stream data, tag information for identifying the continuous shooting mode may be written to the header of each piece of video stream data, and the tag information written in the header may be used as the continuous shooting mode identification information. FIG. 20 shows one example of video stream data 1601 shot in the continuous shooting mode. As shown in FIG. 20, a continuous shooting mode ID tag 1603 and shooting information 1610 are embedded into a header 1602 of the video stream data 1601. Here, the shooting information 1610 includes a shutter speed 1604 and exposure information 1605.

Here, the tag information is, for example, information (for example, with the bit value "1") indicating that the image data or stream data in which the tag information is embedded was shot in the continuous shooting mode.

Alternatively, the continuous shooting mode identification information may be included in the information file.

(3) In the above-described Embodiment 2, the exposure information is included in the information file. However, the present invention is not limited to this.

The exposure information may be stored in any form as far as it is stored in association with each piece of continuously shot image data.

For example, when the continuously shot image data is video stream data, the exposure information may be stored in the header 1602 as shown in FIG. 20. Also, when a plurality of continuously shot images are all still images, the exposure information may be stored in the header of the image data.

(4) In the above-described Embodiment 2, the exposure is determined only once before the continuous shooting is started. However, the present invention is not limited to this.

The exposure may be adjusted (determined) continuously while the continuous shooting is performed.

In this case, for example, the imaging device 2 embeds a corresponding piece of exposure information into the header of each piece of shot image data.

Alternatively, the imaging device 2 writes an exposure, which is determined in correspondence with a continuous shooting number, into the information file.

In the above-described Embodiment 2, all pieces of exposure information are the same. However, not limited to this, when the pieces of exposure information are different from each other, the exposure can be adjusted to an appropriate exposure by performing a calculation with use of Equation 3. Especially, when the exposure adjustment is performed individually, it is possible to respond to the change in the light of the environment during the continuous shooting, and generate a slow shutter image (synthesized image) of a higher quality.

(5) The above-described embodiment and modifications may be combined in various ways.

2.4 Summary of Embodiment 2

According to Embodiment 2, when a slow shutter image is generated from one or more continuously shot images, the brightness is adjusted to the appropriate exposure. This makes it possible to generate a slow shutter image at the appropriate exposure from the continuously shot images even if the exposure is short at the time of the continuous shooting. Also, compared with the case where the images are synthesized after the exposure is adjusted for each of the images, the amount of calculation is reduced because the number of calculations performed to increase the gain is reduced. In addition, compared with the case where values are added after the exposure is corrected individually, the noise component can be prevented from being highlighted due to the increase of the gain.

Embodiment 2 describes a method in which the information for the exposure correction is directly stored into the continuously shot image data. However, the same advantageous effect will be produced by another method in which the information such as the aperture, shutter speed, brightness and the like that are necessary for calculating the exposure is stored, and calculations are so that the appropriate exposure can be obtained at the time of the synthesizing. Also, in addition to the exposure correction, the present invention is applicable as follows. That is to say, for example, the motion of camera at the time of shooting may be obtained by the acceleration sensor or the like, and the obtained motion of camera may be stored for use in the process of correcting the positional shift caused by the jiggling hand, when images are synthesized. This would improve the image quality of the synthesized image.

3. Embodiment 3

The imaging device in Embodiment 3 further has a function to store the synthesizing information into the storage device in correspondence with continuously shot images, when images are continuously shot in the continuous shooting mode and when a synthesized image is generated in the editing mode. The following describes the operation unique to Embodiment 3 with reference to the attached drawings.

An imaging device 3 in Embodiment 3 generates an information file that contains shooting information that is composed of a continuous shooting speed and synthesizing information.

In this example, the synthesizing information includes a synthesizing start position, a synthesizing end position (or the number of images to be synthesized), and values of $\alpha$ and $\beta$ in Equations 1 and 2.

In the following, description of the portions that are also included in Embodiment 1 is omitted, and the differences from Embodiment 1 and the effects brought thereby will be described. Note that the imaging device 3 includes the same structural elements as those in Embodiment 1, and they have the same reference signs as those in Embodiment 1.

3.1 Structure of Imaging Device 3

Figure 21:
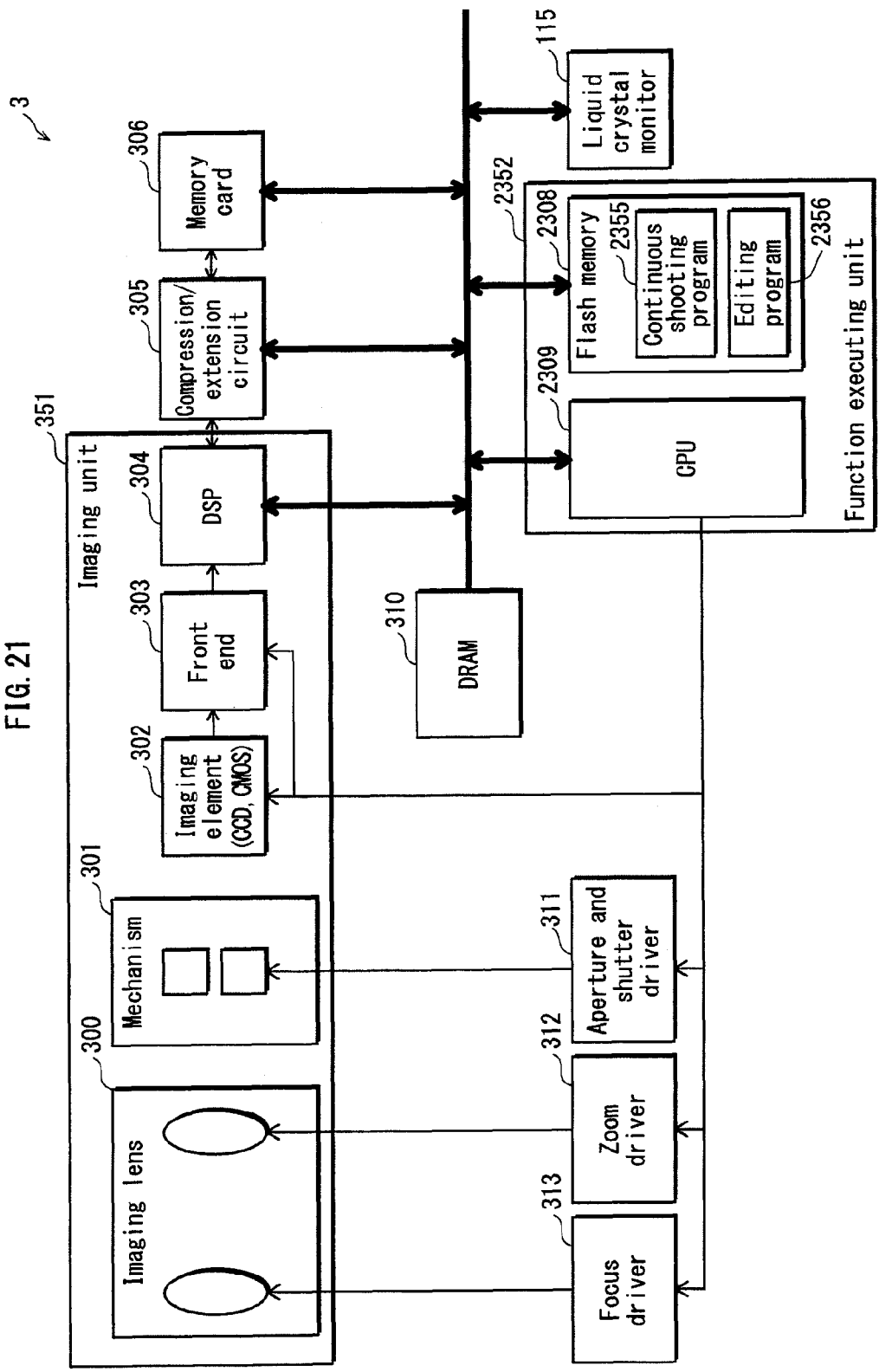
FIG. 21 is a block diagram showing the structure of the imaging device 3.

The imaging device 3, as shown in FIG. 21, includes the imaging unit 351, a function executing unit 2352, the compression/extension circuit 305, the memory card (secondary storage medium) 306, the liquid crystal monitor 115, the DRAM 310, the aperture and shutter driver 311, the zoom driver 312, and the focus driver 313 for performing the focus control.

Now, a description is given of the function executing unit 2352 which is different from the corresponding one in Embodiment 1.

The function executing unit 2352 includes a flash memory 2308 and a CPU 2309, where programs are stored in the flash memory 2308 and the CPU 2309 controls the whole system.

Here, as in Embodiment 2, the operation of the function executing unit 2352 in the shooting process in the continuous shooting mode and in the synthesizing process in the editing mode will be described.

The flash memory 2308, as shown in FIG. 21, includes a continuous shooting program 2355 and an editing program 2356.

The continuous shooting program 2355 performs the shooting process in the continuous shooting mode.

The editing program 2356 performs the process of generating one synthesized image by performing the synthesizing process onto one or more continuously shot images. Note that, when one synthesized image is generated from one image, the synthesized image is the same as the image before the synthesizing process.

Note also that each program includes data to be used by the program itself, as well as the code that indicates the operation content.

The CPU 2309 realizes the functions of the function executing unit 2352 by cooperating with other constitutional elements by using the continuous shooting program 2355 and the editing program 2356.

Figure 22:
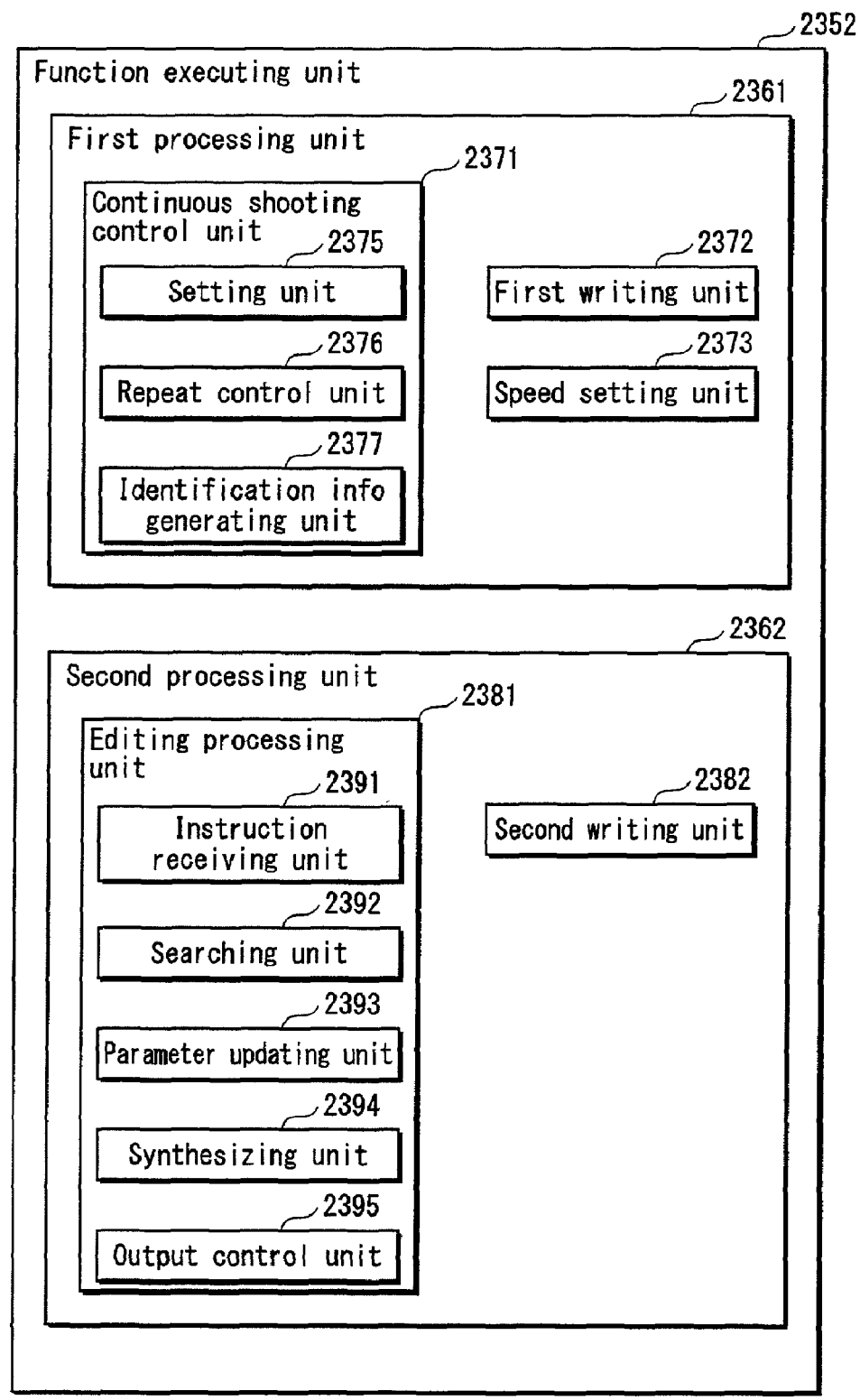
FIG. 22 is a block diagram showing the structure of the function executing unit 2352.

The function executing unit 2352, as shown in FIG. 22, is composed of a first processing unit 2361 and a second processing unit 2362.

The first processing unit 2361 has a function that is realized when the CPU 2309 cooperates with other constitutional elements by using the continuous shooting program 2355.

The second processing unit 2362 has a function that is realized when the CPU 2309 cooperates with other constitutional elements by using the editing program 2356.

The CPU 2309 switches among functions by switching among programs to be activated, in accordance with an instruction from the user.

Specific examples of switching among functions are described in Embodiment 1, and description thereof is omitted here.

The following describes the first processing unit 2361 and the second processing unit 2362.

(1) First Processing Unit 2361

The first processing unit 2361 is composed of a continuous shooting control unit 2371, a first writing unit 2372, and a speed setting unit 2373.

The first writing unit 2372 and the speed setting unit 2373 are the same as the first writing unit 372 and the speed setting unit 373 in Embodiment 1, and description thereof is omitted here.

(1-1) Continuous Shooting Control Unit 2371

The continuous shooting control unit 2371 is composed of a setting unit 2375, a repeat control unit 2376, and an identification information generating unit 2377, and performs the control in relation to the continuous shooting.

When the shutter button is pressed in the continuous shooting mode, the continuous shooting control unit 2371 starts recording the image data received from the imaging element 302.

The following describes details of the operation.

(Setting Unit 2375)

The setting unit 2375 is the same as the setting unit 375 described in Embodiment 1, and description thereof is omitted here.

(Identification Information Generating Unit 2377)

The identification information generating unit 2377, when the focal length and the exposure are determined by the setting unit 2375, generates continuous shooting mode identification information. In this example, as is the case with Embodiment 1, the continuous shooting mode identification information includes a name of a folder for storing the continuously shot images (continuously shot image data), and includes names of sub-folders that belong to the folder.

The identification information generating unit 2377, each time a shooting is performed in the continuous shooting mode, generates a sub-folder for storing the continuously shot image data individually.

The identification information generating unit 2377 generates an information file including shooting information, writes the generated information file under a sub-folder as a piece of continuous shooting mode identification information that is generated each time the a continuous shooting is set in the continuous shooting mode, and performs the initial setting of the memory card to store the continuously shot image data.

The identification information generating unit 2377, upon receiving a continuous shooting completion notification from the repeat control unit 2376, initializes the synthesizing information. In this example, the identification information generating unit 2377 sets values of the synthesizing start position, synthesizing end position (or the number of images to be synthesized), and values of $\alpha$ and $\beta$ in Equations 1 and 2 and the like to the initial value, and generates synthesizing information composed of various values having been set to the initial values. For example, the identification information generating unit 2377 sets the synthesizing start position and synthesizing end position to, as the initial value, continuous shooting number "1" indicating the starting image, and sets all values of $\alpha$ and $\beta$ in Equations 1 and 2 to "1".

The identification information generating unit 2377 stores the generated synthesizing information under a sub-folder. More specifically, the identification information generating unit 2377 adds the generated synthesizing information into the information file that has been written previously.

(Repeat Control Unit 2376)

The repeat control unit 2376, as is the case with the repeat control unit 376 in Embodiment 1, controls the operation of the imaging unit 351 and the first writing unit 2372 while the shutter button 102 is being pressed.

When the user releases the shutter button 102, the repeat control unit 2376 ends the recording of the image data by stopping controlling the operation of the first writing unit 2372, and outputs a completion notification to the identification information generating unit 2377.

(2) Second Processing Unit 2362

The second processing unit 2362 differs from the second processing unit 362 in that it does not initializes the parameters at the start of the editing process, and that it updates the synthesizing information included in the information file at the time of writing the synthesized image data.

The following describes centering on the differences.

The second processing unit 2362 is composed an editing processing unit 2381 and a second writing unit 2382.

(2-1) Editing Processing Unit 2381

The editing processing unit 2381 includes an instruction receiving unit 2391, a searching unit 2392, a parameter updating unit 2393, a synthesizing unit 2394, and an output control unit 2395.

(Instruction Receiving Unit 2391)

The instruction receiving unit 2391, when the mode is set to the editing mode by a user operation, outputs the editing mode start instruction to the searching unit 2392.

The instruction receiving unit 2391, when the user selects a continuously shot image data group as the editing target, outputs (i) an obtain instruction instructing to obtain the synthesizing information and (ii) a piece of continuous shooting mode identification information corresponding to the selected continuously shot image data group, to the parameter updating unit 2393. Also, the instruction receiving unit 2391 outputs the piece of continuous shooting mode identification information that corresponds to the selected continuously shot image data group, to the synthesizing unit 2394.

The instruction receiving unit 2391, upon receiving a change request from the user on the editing screen, outputs the received change request to the parameter updating unit 2393.

The instruction receiving unit 2391, when the user presses the menu/enter button 112 on the editing screen, outputs a write instruction which instructs to write, to the second writing unit 2382.

(Searching Unit 2392)

The searching unit 2392 is the same as the searching unit 392 in Embodiment 1, so description thereof is omitted here.

(Parameter Updating Unit 2393)

The parameter updating unit 2393, upon receiving the obtain instruction and a piece of continuous shooting mode identification information, obtains synthesizing information included in an information file that corresponds to the received piece of continuous shooting mode identification information. More specifically, the parameter updating unit 2393 reads out the synthesizing information from an information file that exists under a sub-folder identified by the received piece of continuous shooting mode identification information.

The parameter updating unit 2393 temporarily stores values of the parameters included in the obtained synthesizing information, into the DRAM 310.

The parameter updating unit 2393, upon receiving the change request, updates the change-target parameter stored in the DRAM 310 based on the received change request, and outputs an update completion notification indicating that the parameter has been updated, to the synthesizing unit 2394.

(Synthesizing Unit 2394)

The synthesizing unit 2394 prestores Equation 1. Note that the synthesizing unit 2394 may prestore Equation 2.

The synthesizing unit 2394, upon receiving the continuous shooting mode identification information from the instruction receiving unit 2391, generates synthesized image data from one or more pieces of continuously shot image data that are included in the sub-folder indicating the received continuous shooting mode identification information, by using Equation 1 (or Equation 2) and the parameters included in the continuous shooting mode identification information received by the parameter updating unit 2393. The synthesizing unit 2394 temporarily stores the generated synthesized image data into the DRAM 310.

The synthesizing unit 2394, upon receiving the update completion notification from the parameter updating unit 2393, re-generates the synthesized image data by using Equation 1 (or Equation 2) and the parameters which have been updated by the parameter updating unit 2393. The synthesizing unit 2394 replaces the synthesized image data temporarily stored in the DRAM 310 with the synthesized image data after update (re-generated synthesized image data).

Note that the synthesizing unit 2394 obtains the parameters to be used for generating (re-generating) the synthesized image data, from the DRAM 310.

Also, when the synthesizing unit 2394 stores the generated (re-generated) synthesized image data into the DRAM 310, the synthesizing unit 2394 also updates the contents (the shutter speed and so on) of the header information such as the EXIF information so that the synthesized image data with the updated header information is stored.

(Output Control Unit 2395)

The output control unit 2395 is the same as the output control unit 395 in Embodiment 1, so description thereof is omitted here.

(2-2) Second Writing Unit 2382

The second writing unit 2382, upon receiving the write instruction from the editing processing unit 2381, causes the compression/extension circuit 305 to compress the synthesized image data stored in the DRAM 310, and writes the compressed synthesized image data into a predetermined folder (in this example, sub-folder "xxxx") in the memory card 306.

The second writing unit 2382 further obtains synthesizing information that was used to generate the synthesized image data stored in the DRAM 310. The second writing unit 2382 updates the synthesizing information included in the information file corresponding to the continuously shot image data group from which the synthesized image is to be generated, to the obtained synthesizing information.

3.2 Operation of Imaging Device 3

(1) Basic Operation

The focus/exposure determining process, still image shooting process, and reproducing (preview) process, which constitute the basic operation of the imaging device 3 are the same as those described in Embodiment 1, and description thereof is omitted here.

(2) Continuous Shooting Process

Here, with respect to the continuous shooting process in the continuous shooting mode, an operation unique to Embodiment 3 will be described with reference to the flowchart shown in FIG. 23.

Figure 23:
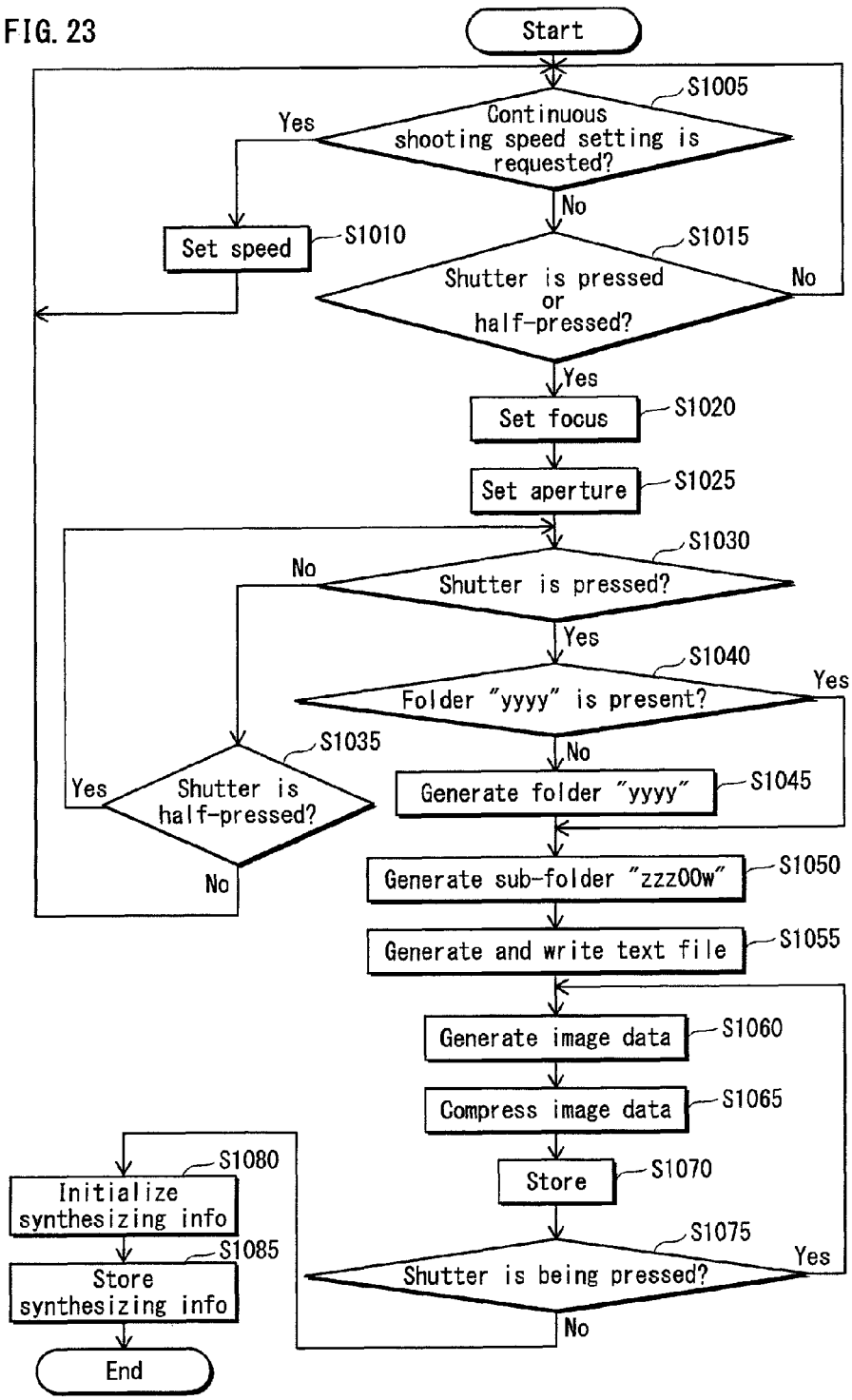
FIG. 23 is a flowchart of the continuous shooting process in the continuous shooting mode in the imaging device 3.

FIG. 23 shows the procedures which include the process related to storage of the synthesizing information, in addition to the procedures shown in FIG. 14. Steps S1005 through S1075 in FIG. 23 are the same as the corresponding steps in FIG. 14 that have been described in Embodiment 1, and description thereof is omitted here.

In the following, the judgment process in step S1075 and onwards will be described, and especially, the procedure after it is judged in step S1075 that the shutter is not being pressed will be described.

When it is judged in that the shutter is not being pressed, namely, when the user releases the shutter button 102 (No in step S1075), the identification information generating unit 2377 initializes the synthesizing information (step S1080). More specifically, the identification information generating unit 2377 sets values of the synthesizing start position, synthesizing end position (or the number of images to be synthesized), and values of $\alpha$ and $\beta$ in Equations 1 and 2 and the like to the initial value, and generates synthesizing information composed of various values having been set to the initial values.

The identification information generating unit 2377 stores the generated synthesizing information under a sub-folder (step S1085). More specifically, the identification information generating unit 2377 adds the generated synthesizing information into the information file that has been written previously.

(3) Editing Process

Here, with respect to the editing process in the editing mode, an operation unique to Embodiment 3 will be described with reference to the flowchart shown in FIG. 24.

Figure 24:
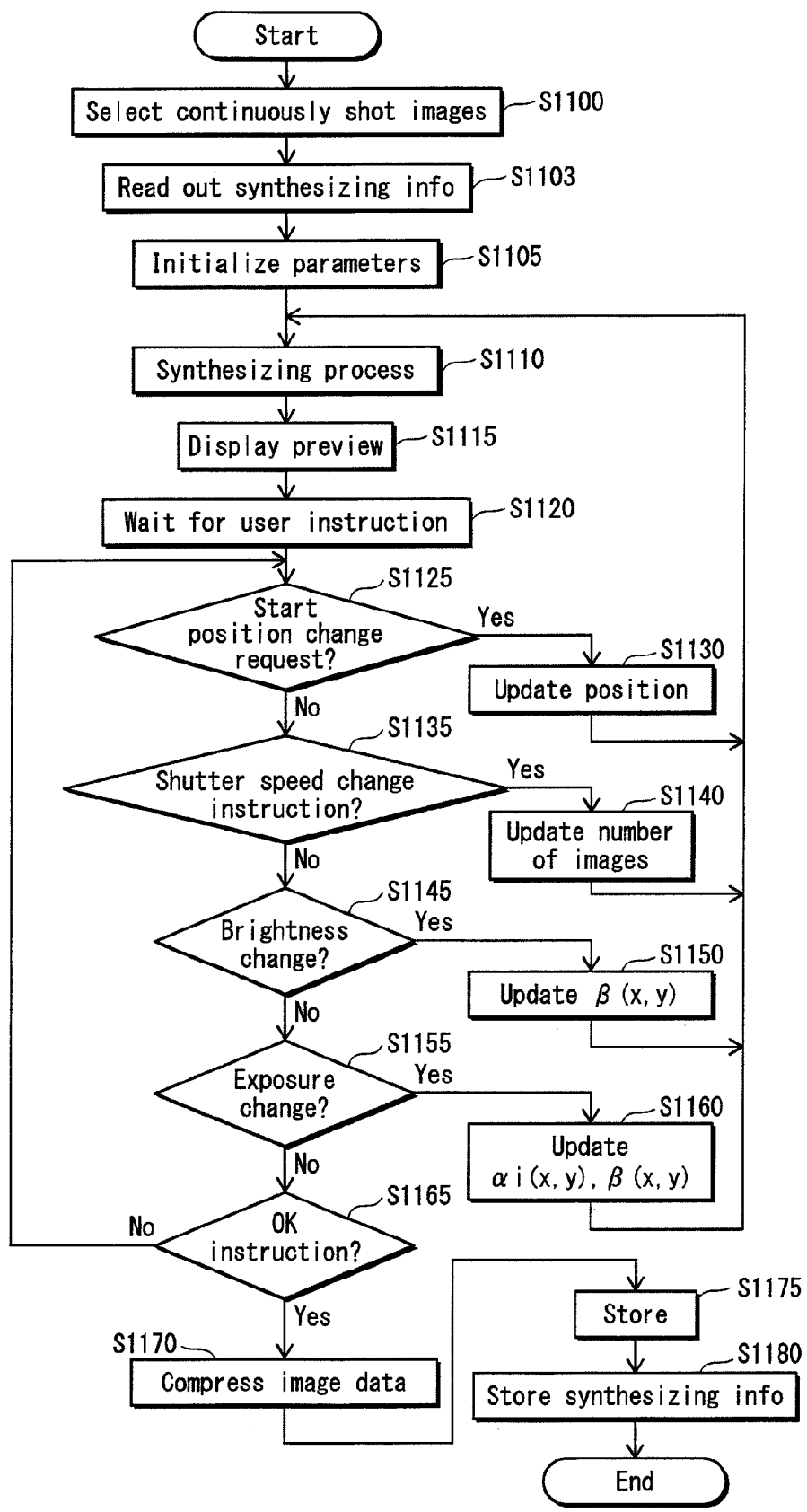
FIG. 24 is a flowchart of the editing process in the editing mode in the imaging device 3.

FIG. 24 shows the procedures which include the process related to use of the synthesizing information, in addition to the procedures of the editing mode shown in FIG. 15.

The instruction receiving unit 2391 receives, from the user, a selection of the continuously shot image data group, which is selected as the editing target (step S1100).

The parameter updating unit 2393 reads out the synthesizing information included in the information file corresponding to the editing-target continuously shot image data group (step S1103).

The parameter updating unit 2393 sets the parameters included in the read-out synthesizing information, as the initial values for the synthesizing process (step S1105). More specifically, the parameter updating unit 2393 temporarily stores the parameters included in the read-out synthesizing information, into the DRAM 310.

Steps S1110 through S1175 that follow this are the same as steps S110 through S175 shown in FIG. 15, and description thereof is omitted here.

After the compressed synthesized image data is stored (step S1175), the second writing unit 2382 obtains the synthesizing information that was used to generate the synthesized image data stored in the DRAM 310. The second writing unit 2382 updates the synthesizing information included in the information file corresponding to the continuously shot image data group from which the synthesized image is to be generated, to the obtained synthesizing information (step S1180).

3.3 Modifications of Embodiment 3

Up to now, the present invention has been described through Embodiment 3. However, the present invention is not limited to the embodiment, but includes, for example, the following modifications.

(1) In the above-described Embodiment 3, as is the case with the modification of Embodiment 1, when the continuously shot image data is selected in the reproducing mode, the editing process may be performed in accordance with the instruction of the user.

(2) In the above-described Embodiment 3, as is the case with Embodiment 1, the continuous shooting mode identification information is composed of the names of folder and sub-folders storing the continuously shot image data. However, the present invention is not limited to this.

As is the case with the modification of Embodiment 1, for example, when a plurality of images shot in the continuous shooting mode are all still images, tag information for identifying the continuous shooting mode may be written to the header of each piece of continuously shot image data, and the tag information written in the header may be used as the continuous shooting mode identification information.

Figure 25:
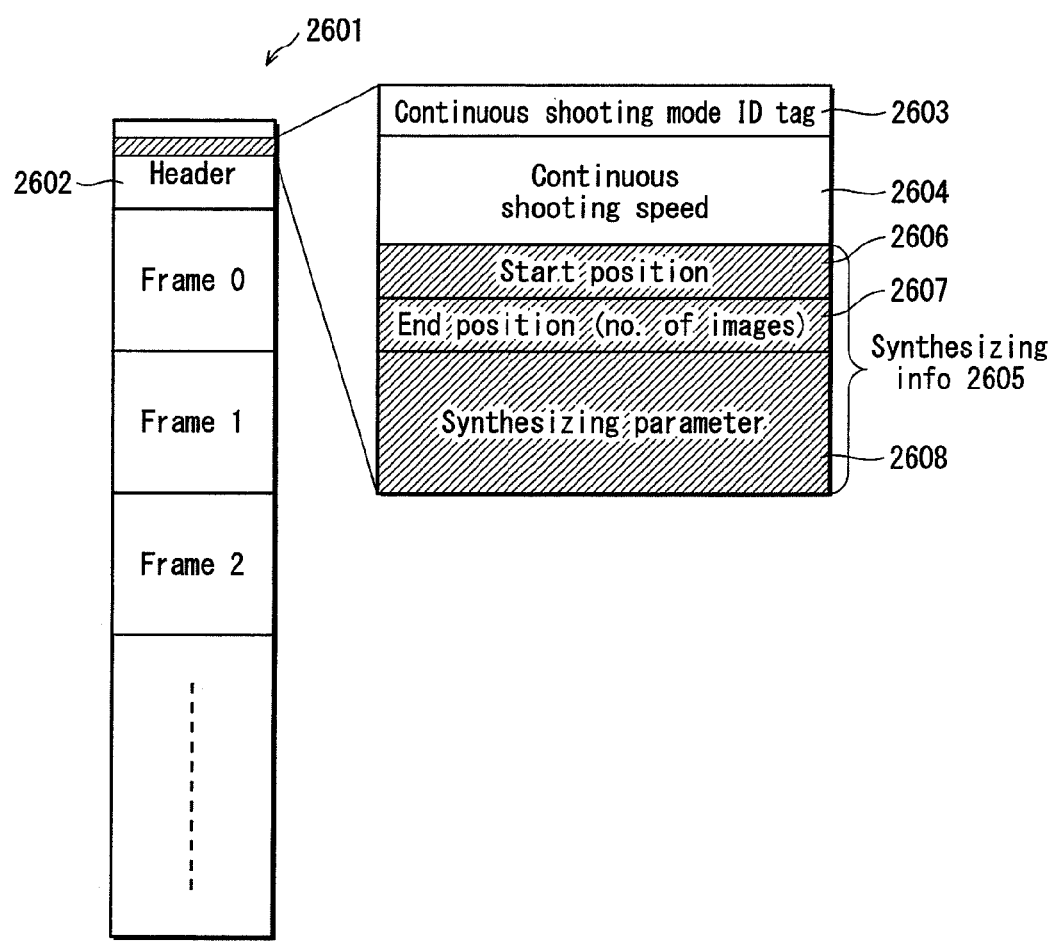
FIG. 25 shows an example of the data structure of the video stream data 2601.

Also, when the continuously shot image data shot in the continuous shooting mode is video stream data, tag information for identifying the continuous shooting mode may be written to the header of each piece of video stream data, and the tag information written in the header may be used as the continuous shooting mode identification information. FIG. 25 shows one example of video stream data 2601 shot in the continuous shooting mode. As shown in FIG. 25, a continuous shooting mode ID tag 2603, continuous shooting speed 2604, and synthesizing information 2605 are embedded into a header 2602 of the video stream data 2601. Here, the synthesizing information 2605 includes a start position 2606, an end position (the number of synthesized images) 2607, and a synthesizing parameter 2608. The start position 2606 is a value indicating the synthesizing start position. The end position (the number of synthesized images) 2607 is a value indicating the synthesizing end position. The synthesizing parameter 2608 indicates values of a and β in Equations 1 and 2. Also, as described earlier, the shooting information includes a continuous shooting shutter speed 2604 and the synthesizing information 2605.

Here, the tag information is, for example, information (for example, with the bit value "1") indicating that the image data or stream data in which the tag information is embedded was shot in the continuous shooting mode.

Alternatively, the continuous shooting mode identification information may be included in the information file.

(3) In the above-described Embodiment 3, the synthesizing start position is an image that corresponds to image data having the continuous shooting number "1". However, the present invention is not limited to this.

The identification information generating unit 2377 may change the initial value of the synthesizing start position, depending on the focal length, light measurement state, and/or face extraction state by the face detection function. For example, an image, which is the first among the images in which the face detected by the face detection function is looking straight out, may be set as the start position. To the setting of this initial value, the technology used for detecting scenes from a video is applicable. The usability is improved by setting an important image obtained by the scene detection, as the start image.

(4) In the above-described Embodiment 3, an association with the continuously shot image data group is made by including the synthesizing information into the information file. However, the present invention is not limited to this.

Such an association may be made by, for example: a method in which a file independent of the information file is stored in the same folder in which the continuously shot image data is stored; or a method in which the information is stored in the header in the case where the continuously shot image data is stored as video stream data, as shown in FIG. 25. Also, when the continuously shot image-data shot in the continuous shooting mode is composed of a plurality of pieces of still image data, the synthesizing information may be stored in the header of each piece of image data.

(5) In the above-described Embodiment 3, the imaging device records the synthesizing information after storing the continuously shot image data. However, the present invention is not limited to this.

The synthesizing information may be recorded before the continuously shot image data is stored.

For example, the imaging device 3 may execute steps S1080 and S1085 shown in FIG. 23 immediately before step S1060.

(6) In the above-described Embodiment 3, the imaging device uses Equation 1 or 2 when generating a synthesized image. However, not limited to this, the imaging device may use Equation 3 when generating a synthesized image.

In this case, the exposure information is attached to the shooting information.

(7) The above-described embodiment and modifications may be combined in various ways.

3.4 Summary of Embodiment 3

As described above, the imaging device 3 reads out the synthesizing information at the start of editing, and rewrites (updates) the synthesizing information at the end of editing. With this structure, when images are synthesized again in the editing mode, the synthesizing information that was generated when images were synthesized previously is readout. This enables the state in which images were synthesized previously to be restored at the start of editing.

This structure makes it possible to re-generate a synthesized image that was generated previously, or to generate with ease a synthesized image that changes slightly in parameter from a synthesized image that was generated previously.

In Embodiment 3, the synthesizing information is automatically stored when a synthesized image is generated. However, not limited to this, the user may explicitly instruct the storage. With such a structure, the user can store desired parameters, further improving the usability. Also, for one continuously shot image, there may be a plurality of pieces of synthesizing information so that the user can select and call one of the plurality of pieces of synthesizing information that have been recorded. The storing of a plurality of pieces of synthesizing information makes it possible to store parameters in correspondence with a plurality of results of image synthesizing, further improving the usability.

4. Other Modifications

Up to now, the present invention has been described through Embodiments 1 to 3. However, the present invention is not limited to the embodiments, but includes, for example, the following modifications.

Figure 26:
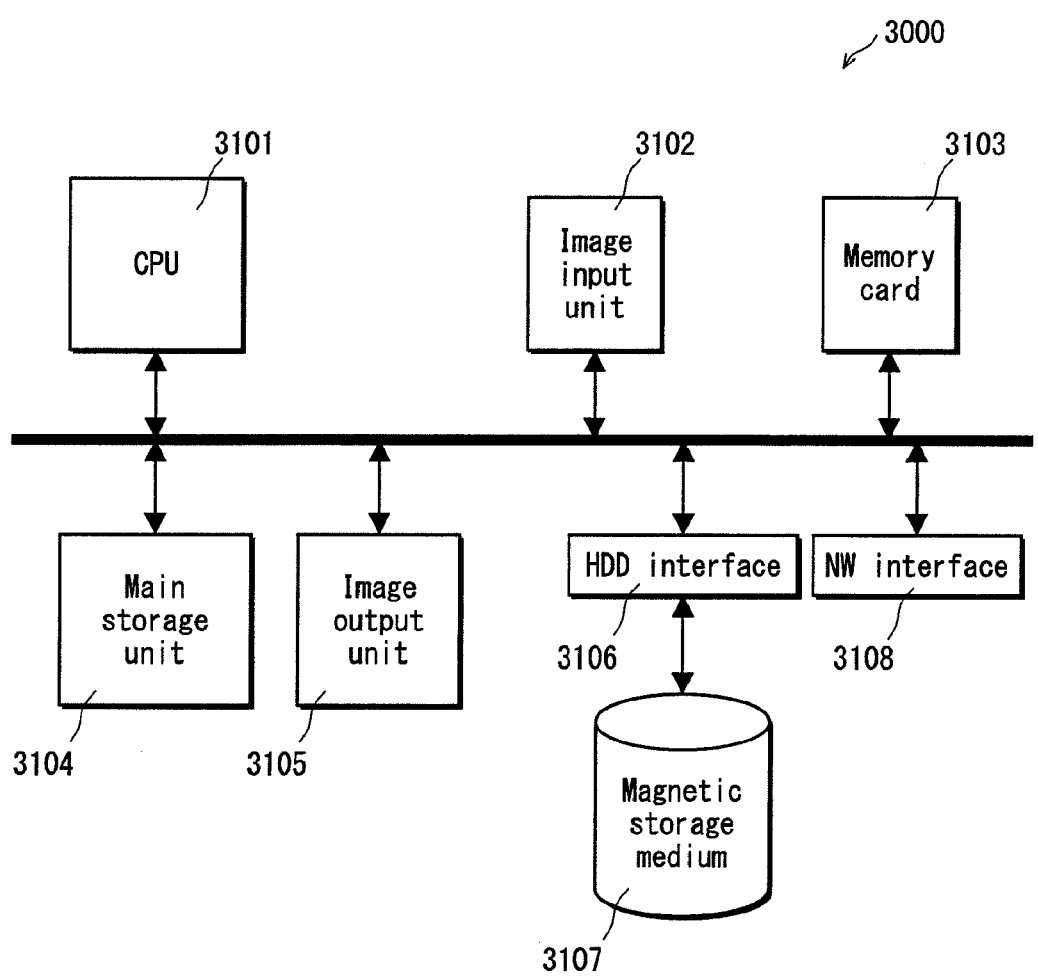
FIG. 26 is a block diagram showing the structure of the information processing device 3000.

(1) The process described in each embodiment may be realized as a program which runs on a computer. FIG. 26 shows one example of the structure of an information processing device 3000 for operating the process of the present invention.

As shown in FIG. 26, the information processing device 3000 includes a processor 3101 for running the program, an image input unit 3102 for inputting images, a memory card 3103 which is an SD card or the like, a main storage unit 3104 which is SDRAM or the like, an image output unit 3105 which is CRT, LCD or the like, a HDD (Hard Disk Drive) interface 3106, a magnetic storage medium 3107 which is HDD or the like, and a NW (NetWork) interface 3108.

The main storage unit 3104 prestores programs (in this example, the continuous shooting program and the editing program).

The processor 3101 reads out a program from the main program, runs the read-out program to perform the process described in each embodiment of the present invention by controlling the image input unit 3102, memory card 3103, HDD interface 3106, magnetic storage medium 3107, NW interface 3108, and image output unit 3105.

More specifically, the information processing device 3000 performs the process described in each embodiment of the present invention by inputting continuously shot image data from the image input unit 3102, storing the continuously shot image data or synthesized image data into the magnetic storage medium 3107, the memory card 3103, or a device connected via a network, and displaying a continuously shot image or a synthesized image on a GUI on the image output unit 3105.

As described above, the system of the present invention can be realized as a program that runs on a computer as well.

Note that it is described above that the main storage unit 3104 prestores the continuous shooting program and the editing program. However, not limited to this, the main storage unit 3104 may obtain a processing-target program from the memory card 3103, the magnetic storage medium 3107, or a network at the start of the processing, and store the obtained program.

Also, the image input unit 3102 may obtain continuously shot image data from the memory card 3103. In this case, as shown in FIG. 27, the user can select a device for generating a synthesized image, from more types of devices.

Figure 27:
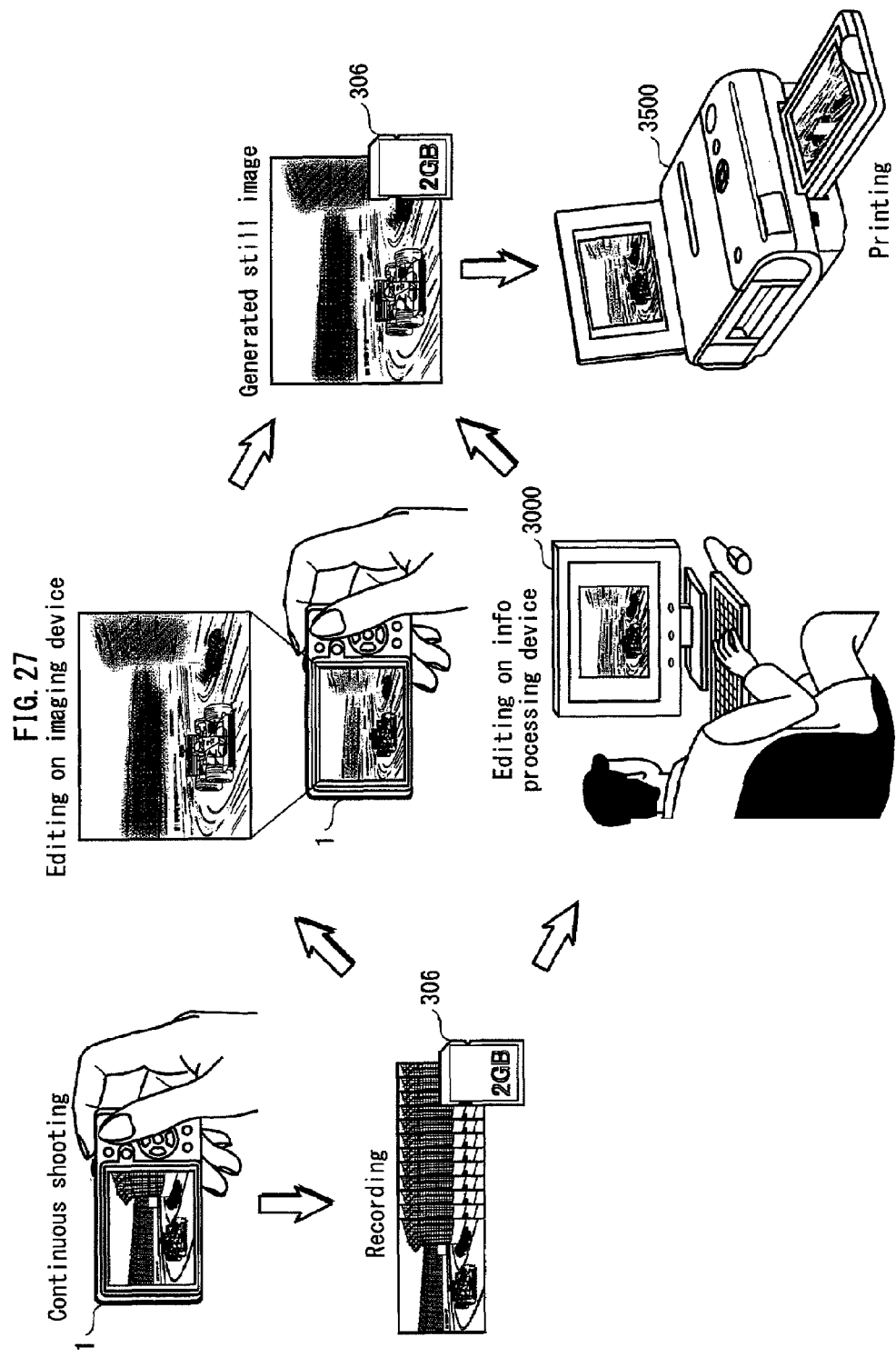
FIG. 27 schematically shows an example of the use form of the present invention.

According to the example shown in FIG. 27, continuously shot image data of images continuously shot by the imaging device 1 is stored in the memory card 306. The user can generate synthesized image data on the main device (the imaging device 1), or on the information processing device 3000 (for example, a personal computer).

The synthesized image data generated on any of such devices is stored into the memory card 306, and a synthesized image represented by the synthesized image data stored in the memory card 306 can be printed by the printer 3500.

(2) Part or all of the constitutional elements described in the embodiments above may be implemented as software. In this case, the number of hardware elements implemented on an integrated circuit can be reduced, and thus the level of the integration is improved.

(3) Part or all of the constitutional elements described in the embodiments above may be implemented as hardware. In this case, the processes can be performed at higher speed than in the case where the constitutional elements are implemented as software. Such an implementation is especially useful in the processes that require a high speed for the sake of convenience of users, such as the saving process and the restoring process.

(4) In the above-described embodiments, the imaging device continues the continuous shooting while the shutter button 376 is pressed in the continuous shooting mode. However, the present invention is not limited to this.

The imaging device may start a continuous shooting when the shutter button is pressed first time, and end the continuous shooting when the shutter button is pressed second time.

In this case, when the shutter button is pressed first time, the repeat control unit 376 receives an instruction for performing a continuous shooting from the shutter button and controls the operation of the imaging unit 351 and the first writing unit 372 to perform the continuous shooting and write image data into the recording medium. Also, when the shutter button is pressed second time, the repeat control unit 376 receives an instruction for ending the continuous shooting from the shutter button and inhibits the operation of the imaging unit 351 and the first writing unit 372 to end the continuous shooting and the recording of image data.

In other words, during a period from the time when the shutter button is pressed first time to the time when the shutter button is pressed second time, the repeat control unit controls the operation to perform the continuous shooting, based on the recognition that the instruction for performing the continuous shooting is being received.

(5) In the above-described embodiments, the imaging device receives the instruction for performing the continuous shooting, by means of the shutter button. However, the present invention is not limited to this.

For this purpose, any user interface may be used as far as it can instruct to perform the continuous shooting. For example, a button dedicated to continuous shooting may be used.

(6) In the above-described embodiments, the continuously shot image data and the synthesized image data are written into a detachable memory card (storage medium, recording medium) However, the present invention is not limited to this.

Such image data may be written into a storage medium (recording medium) embedded in the imaging device. One example of such storage medium (recording medium) embedded in the imaging device is a magnetic storage medium like HDD.

Also, in the above-described embodiments, the continuously shot image data and the synthesized image data are written onto the same storage medium (recording medium). However, the present invention is not limited to this.

The continuously shot image data and the synthesized image data may be written onto different mediums. For example, the imaging device may write the continuously shot image data into a storage medium (recording medium) embedded in the imaging device, and write the synthesized image data into a detachable storage medium (recording medium), and vice versa.

(7) In the above-described embodiments and modifications, image data means data that is processed in the imaging device or is input and/or output to/from the memory card, and an image means what can be displayed on a display or printed by a printer.

Note that when there is no need to distinguish between image data and an image, it is merely recited as an image.

(8) It should be noted here that, although the system LSI may be called the IC, LSI, super LSI, ultra LSI or the like depending on the level of integration, any system LSI of each embodiment described above that is realized at one of these integration levels should be construed as being included in the present invention. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(9) Furthermore, the present invention may be a computer-readable recording medium such as a flexible disk, a hard disk, CD-ROM, MO, DVD, DVD-ROM, DVD-RAM, BD (Blu-ray Disc), or a semiconductor memory, that stores the computer program or the digital signal. Furthermore, the present invention may be the computer program or the digital signal recorded on any of the aforementioned recording mediums.

(10) The present invention may be any combination of the above-described embodiments and modifications.

5. Summary (1) One aspect of the present invention is an imaging device comprising an imaging element for inputting an image, a display device for displaying the image input by the imaging element, and a recording device for processing the image input by the imaging element and recording the image into a secondary storage unit, the imaging device realizing a plurality of operation modes by causing the imaging element, the display device, and the recording device to cooperate with each other, and switching among the plurality of operation modes, the imaging device further comprising: a continuous shooting mode operable to, (i) when a shooting button is pressed to instruct to start a shooting, start recording an image, which is input from the imaging element, into the secondary storage unit that is detachable, (ii) when the shooting button is released, stop recording the into the secondary storage unit, and (iii) record a plurality of images, which were input from the imaging element at predetermined time intervals during a period in which the shooting button was kept to be pressed, into the secondary storage medium together with continuous shooting mode identification information used for identifying that the images are continuously shot images; a list displaying unit operable to identify continuously shot images that are shot by the continuous shooting mode and are recorded in the secondary storage unit, by referring to the continuous shooting mode identification information, and display, as a list, representative images of one or more sequential images shot by the continuous shooting mode; a synthesizing range setting unit operable to, when one continuously shot image is selected from the list displayed by the list displaying unit, set a synthesizing start position and a synthesizing end position; and an editing mode operable to generate a synthesized image by synthesizing images with respect to a portion of the continuously shot image in a range between the synthesizing start position and the synthesizing end position set by the synthesizing range setting unit, and record the generated synthesized image into the secondary storage unit.

(2) In the imaging device of (1) above, the continuous shooting mode may record one piece of shooting information as a whole, records one piece of shooting information each time a change occurs, or records one piece of shooting information for each image, into the secondary storage unit, together with a plurality of input images, wherein each piece of the shooting information indicates a state of a camera at a shooting, and the editing mode generates the synthesized image by using the shooting information.

(3) In the imaging device of (1) or (2) above, the continuous shooting mode may initialize synthesizing information that is necessary for synthesizing and records the synthesizing information into the secondary storage unit together with the plurality of input images, and the editing mode initializes a synthesizing process by reading out the synthesizing information and updates the synthesizing information recorded in the secondary storage unit when the synthesizing information is changed or when the generated synthesized image is recorded into the secondary storage unit.

(4) Another aspect of the present invention is an imaging device comprising: a shooting button operable to specify a start and an end of a shooting; a recording unit operable to record therein a plurality of images, which were input from an imaging element at predetermined time intervals during a period specified by the shooting button, together with shooting information that indicates a state of a camera at shooting of each input image; and a synthesizing unit operable to generate a synthesized image by synthesizing one or more images in a range between a synthesizing start position and a synthesizing end position among the plurality of images recorded in the recording unit, and record the generated synthesized image.

(5) In the imaging device of one of (2) to (4) above, the shooting information may include exposure information, and in the synthesizing process, a gain of each image is adjusted so that a synthesized image has an appropriate exposure.

(6) In the imaging device of one of (2) to (5) above, in the synthesizing process, a shutter speed of a synthesized image may be calculated in accordance with the number of images to be synthesized, and the calculated synthesized image may be displayed on a display device or embedded in the synthesized image as shutter speed information.

(7) In the imaging device of (3) above, the synthesizing information may be composed of a synthesizing start position and a synthesizing end position, or may be composed of a synthesizing start position and the number of images to be synthesized.

(8) In the imaging device of one of (1) to (7) above, in the synthesizing process performed by the synthesizing mode, a gain adjustment may be performed with use of a first gain value that is set preliminarily for each of images to be synthesized or for each pixel of each image, and after the images are synthesized after the gain adjustment, a gain adjustment may be performed with use of a second gain value that is set preliminarily as a whole or set preliminarily for each pixel.

(9) In the imaging device of (3) above, in the synthesizing process performed by the synthesizing mode, a gain adjustment may be performed with use of a first gain value that is specified for each of images to be synthesized or for each pixel of each image, and after the images are synthesized after the gain adjustment, a gain adjustment may be performed with use of a second gain value that is specified as a whole or specified for each pixel, and the synthesizing information may include the first gain value and the second gain value.

(10) A still another aspect of the present invention is an image processing method for use in an imaging device comprising an imaging element for inputting an image, a display device for displaying the image input by the imaging element, and a recording device for processing the image input by the imaging element and recording the image into a secondary storage unit, the imaging device realizing a plurality of operation modes by causing the imaging element, the display device, and the recording device to cooperate with each other, and switching among the plurality of operation modes, the image processing method comprising: a continuous shooting mode which, (i) when a shooting button is pressed to instruct to start a shooting, starts recording an image, which is input from the imaging element, into the secondary storage unit that is detachable, (ii) when the shooting button is released, stops recording the into the secondary storage unit, and (iii) record a plurality of images, which were input from the imaging element at predetermined time intervals during a period in which the shooting button was kept to be pressed, into the secondary storage medium together with continuous shooting mode identification information used for identifying that the images are continuously shot images; a list displaying step which identifies continuously shot images that are shot by the continuous shooting mode and are recorded in the secondary storage unit, by referring to the continuous shooting mode identification information, and displays, as a list, representative images of one or more sequential images shot by the continuous shooting mode; a synthesizing range setting step which, when one continuously shot image is selected from the list displayed by the list displaying step, sets a synthesizing start position and a synthesizing end position; and an editing mode which generates a synthesized image by synthesizing images with respect to a portion of the continuously shot image in a range between the synthesizing start position and the synthesizing end position set by the synthesizing range setting step, and records the generated synthesized image into the secondary storage unit.

(11) In the image processing method of (10) above, the continuous shooting mode may record one piece of shooting information as a whole, records one piece of shooting information each time a change occurs, or records one piece of shooting information for each image, into the secondary storage unit, together with a plurality of input images, wherein each piece of the shooting information indicates a state of a camera at a shooting, and the editing mode generates the synthesized image by using the shooting information.

(12) In the image processing method of (10) or (11) above, the continuous shooting mode may initialize synthesizing information that is necessary for synthesizing and records the synthesizing information into the secondary storage unit together with the plurality of input images, and the editing mode initializes a synthesizing process by reading out the synthesizing information and updates the synthesizing information recorded in the secondary storage unit when the synthesizing information is changed or when the generated synthesized image is recorded into the secondary storage unit.

(13) A further aspect of the present invention is a program for image processing that is executed by a computer loaded in an imaging device comprising an imaging element for inputting an image, a display device for displaying the image input by the imaging element, and a recording device for processing the image input by the imaging element and recording the image into a secondary storage unit, the imaging device realizing a plurality of operation modes by causing the imaging element, the display device, and the recording device to cooperate with each other, and switching among the plurality of operation modes, the program comprising: a continuous shooting mode which, (i) when a shooting button is pressed to instruct to start a shooting, starts recording an image, which is input from the imaging element, into the secondary storage unit that is detachable, (ii) when the shooting button is released, stops recording the into the secondary storage unit, and (iii) record a plurality of images, which were input from the imaging element at predetermined time intervals during a period in which the shooting button was kept to be pressed, into the secondary storage medium together with continuous shooting mode identification information used for identifying that the images are continuously shot images; a list displaying process which identifies continuously shot images that are shot by the continuous shooting mode and are recorded in the secondary storage unit, by referring to the continuous shooting mode identification information, and displays, as a list, representative images of one or more sequential images shot by the continuous shooting mode; a synthesizing range setting process which, when one continuously shot image is selected from the list displayed by the list displaying process, sets a synthesizing start position and a synthesizing end position; and an editing mode which generates a synthesized image by synthesizing images with respect to a portion of the continuously shot image in a range between the synthesizing start position and the synthesizing end position set by the synthesizing range setting process, and records the generated synthesized image into the secondary storage unit.

(14) In the program of (13) above, the continuous shooting mode may record one piece of shooting information as a whole, records one piece of shooting information each time a change occurs, or records one piece of shooting information for each image, into the secondary storage unit, together with a plurality of input images, wherein each piece of the shooting information indicates a state of a camera at a shooting, and the editing mode generates the synthesized image by using the shooting information.

(15) In the program of (13) or (14) above, the continuous shooting mode may initialize synthesizing information that is necessary for synthesizing and records the synthesizing information into the secondary storage unit together with the plurality of input images, and the editing mode initializes a synthesizing process by reading out the synthesizing information and updates the synthesizing information recorded in the secondary storage unit when the synthesizing information is changed or when the generated synthesized image is recorded into the secondary storage unit.

(16) According to the present invention, the image data shot in the continuous shooting mode is recorded in the secondary storage device together with the continuous shooting mode identification information that is used to distinguish between the images shot in the continuous shooting mode and the images shot in the other modes. And then when synthesizing process of synthesizing images is to be performed in the editing mode, the continuously shot images to be synthesized are read out from the secondary storage by using the continuous shooting mode identification information, and the synthesizing process is performed.

With this structure, when only the images shot in the continuous shooting mode are to be synthesized, and the editing is to be performed after a considerable amount of images have been shot, only the images shot in the continuous shooting mode can be selected to be edited. Also, by storing the images shot in the continuous shooting mode into the secondary storage which is detachable, continuously shot images of the data size that is larger than the capacity of the memory embedded in the imaging device can be obtained.

With this structure, when the images are shot at a high speed of, for example, 100 frames per second, it is possible to record continuously shot images for, for example, several seconds, exceeding the capacity of the embedded memory.

(17) Also, according to the present invention, in the continuous shooting mode, a plurality of shot images are recorded together with shooting information which indicates a state of a camera at a shooting, and in the synthesizing process in the editing mode, a synthesized image is generated by using the shooting information. This enables the synthesizing process to be performed in accordance with the shooting state. This accordingly makes it possible to change the contents of the synthesizing process in accordance with the state of the camera at the continuous shooting, providing more preferable synthesizing.

(18) Also, according to the present invention, in the continuous shooting mode, the synthesizing information required for the synthesizing is initialized and recorded, and in the editing mode, initialization is performed by referring to the synthesizing information having been recorded before the synthesizing, and the synthesizing information is updated to the synthesizing information obtained at the time the synthesizing process is performed to generate a synthesized image. With this structure, when the synthesizing process is to be performed again in the editing mode, the synthesizing process can be started with the setting of the previous synthesizing process.

(19) Further, according to the present invention, the shooting button is used to specify the start and end of shooting, and during a period between the specified start and end, images shot at predetermined time intervals and input from the shooting element are recorded together with the shooting information that indicates the state of the camera at the shooting of each image, and, among the shot images, images in a range between a synthesizing start position and a synthesizing end position are synthesized by using the shooting information. This makes it possible to synthesize images by using information indicating the state at the shooting of each image, enabling more preferable images to be generated.

(20) Further, according to the present invention, the shooting button includes exposure information, and in the synthesizing process, a gain of each image is adjusted so that a synthesized image has an appropriate exposure. With this structure, it is possible to perform a gain adjustment in accordance with the number of images to be synthesized, enabling a preferable synthesized image to be obtained while reducing the noise component and the like.

(21) Further, according to the present invention, the shooting information includes a continuous shooting speed, and the shutter speed to be embedded in the image that is to be generated and displayed is determined in accordance with the number of images to be synthesized. With this structure, it is possible to indicate to the user the shutter speed of the synthesized image, namely, the shutter speed at which a corresponding image would have actually been shot. Also, a corrected value indicating the shutter speed is recorded in the generated image.

(22) According to the present invention, it is possible to re-edit the data of the images shot in the continuous shooting mode.

INDUSTRIAL APPLICABILITY

The present invention can be used continuously and repetitively on a business basis in industries for manufacturing and selling the imaging device or the information processing device for performing image processing.

The imaging device, the image processing method for use in the imaging device, and the program of the present invention can realize the effect of a slow shutter shooting even with a high-speed continuous shooting, by storing continuously shot images into a secondary storage device, and performing a synthesizing process onto the continuously shot images. It is also possible to generate a synthesized image repeatedly as necessary by storing continuously shot images into the secondary storage device and editing the continuously shot images later. These functions are useful in shootings by a digital camera.

The invention claimed is:

1. An imaging device for generating a plurality of still images continuously and generating a synthesized image from the still images, the imaging device comprising:
  a shooting button which, when pressed, instructs a continuous shooting; an imaging unit operable to generate still image data from incident light;
  a still image data writing unit operable to write the generated still image data into a recording medium;
  an editing unit operable to generate a synthesized image by using a plurality of continuous pieces of still image data which are obtained by the continuous shooting; and
  a control unit operable to perform a process of storing sequentially, into the recording medium, the plurality of continuous pieces of still image data obtained by the continuous shooting, by repeatedly controlling the imaging unit and the still image data writing unit while the shooting button is pressed to instruct the continuous shooting, and after the continuous shooting ends, enter a wait state to wait for a new instruction, and then upon receiving an instruction to start generating the synthesized image from the plurality of continuous pieces of still image data obtained by the continuous shooting, control the editing unit to perform a process of generating the synthesized image by using the plurality of continuous pieces of still image data stored in the recording medium,
  wherein the control unit further writes, as one group, all pieces of still image data generated by repeatedly controlling the imaging unit and the still image data writing unit, into the recording medium, by associating each piece of still image data in the group with continuous shooting mode identification information indicating the continuous shooting,
  wherein the editing unit generates the synthesized image by using one or more pieces of still image data among the still image data recorded in association with the continuous shooting mode identification information in the recording medium, and
  wherein the editing unit includes:
    a determining sub-unit operable to determine first still image data and second still image data out of the generated all pieces of still image data;
    an obtaining sub-unit operable to obtain sequential pieces of still image data, which starts with the first still image data and ends with the second still image data, from the recording medium;
    a synthesizing sub-unit operable to generate the synthesized image by synthesizing the obtained sequential pieces of still image data, and
  wherein the plurality of continuous pieces of still image data includes more than two pieces of still image data.

2. The imaging device of claim 1,
  wherein the synthesizing sub-unit obtains pixel values of pixels at a same position in still images respectively represented by the sequential pieces of still image data, and
  wherein the synthesizing sub-unit adjusts brightness with respect to each of the obtained pixel values, determines, based on pixel values after the brightness adjustment, a pixel value of a pixel at the same position in the synthesized image to be generated, and generates the synthesized image by repeating the obtaining of pixel values, the adjusting of brightness, and the determining of pixel value until pixel values of all pixels constituting the synthesized image to be generated are determined.

3. The imaging device of claim 2,
  wherein the synthesizing sub-unit calculates adjusted pixel values by adjusting brightness with respect to each pixel value obtained from the sequential pieces of still image data, depending on circumstances of still image data to which the each pixel value belongs to, and
  wherein the synthesizing sub-unit determines the pixel value of the pixel at the same position in the synthesized image to be generated, based on an average of all calculated adjusted pixel values.

4. The imaging device of claim 3,
  wherein the still image data writing unit writes the still image data into the recording medium after attaching a continuous shooting number to each piece of the still image data, the continuous shooting number indicating an order of each piece in the continuous shooting, and
  wherein the synthesizing sub-unit generates a pixel at a position indicated by a coordinate (x,y) in the synthesized image to be generated, by calculating, with use of Equation 1, a pixel value P'(x,y) at the coordinate (x,y) in the synthesized image to be generated, $$P'(x, y) = \beta(x, y)\frac{\sum_{i=a}^{b} \alpha_i(x, y)P_i(x, y)}{(b-a+1)} \quad \text{[Equation 1]}$$

in Equation 1, "a" represents a first continuous shooting number attached to the first still image data, "b" represents a second continuous shooting number attached to the second still image data, "Pi(x,y)" represents a pixel value of a pixel indicated by the coordinate (x,y) in a still image represented by a piece of still image data attached with continuous shooting number "i", "αi(x,y)" represents a constant for adjustment of brightness to be set for the pixel at the coordinate (x,y) of the $i^{th}$ piece of still image data, and "β(x,y)" represents a constant for adjustment of brightness to be set for a pixel indicated by the coordinate (x,y) in a still image after the synthesizing.

5. The imaging device of claim 3,
wherein the still image data writing unit writes the still image data into the recording medium after attaching a continuous shooting number to each piece of the still image data, the continuous shooting number indicating an order of each piece in the continuous shooting, and
wherein the synthesizing sub-unit generates a pixel at a position indicated by a coordinate (x,y) in the synthesized image, by calculating, with use of Equation 2, a pixel value P'(x,y) at the coordinate (x,y) in the synthesized image, $$P'(x, y) = \beta \frac{\sum_{i=a}^{b} \alpha_i P_i(x, y)}{(b-a+1)} \quad \text{[Equation 2]}$$

in Equation 2, "a" represents a first continuous shooting number attached to the first still image data, "b" represents a second continuous shooting number attached to the second still image data, "Pi(x,y)" represents a pixel value of a pixel indicated by the coordinate (x,y) in a still image represented by a piece of still image data attached with continuous shooting number "i", "αi" represents a constant for adjustment of brightness to be set for an $i^{th}$ still image, and "β" represents a constant for adjustment of brightness to be set for a still image after the synthesizing.

6. The imaging device of claim 2,
wherein the control unit associates each piece of still image data, which is generated and written by repeatedly controlling the imaging unit and the still image data writing unit, with exposure information that is set when a shooting is performed based on a predetermined exposure value,
wherein the still image data writing unit writes the generated still image data into the recording medium together with the exposure information associated therewith, and
wherein the synthesizing sub-unit, when a synthesized image is generated, generates the synthesized image by performing an exposure correction so that the synthesized image to be generated has an appropriate exposure for brightness, by using the exposure information associated with each of the obtained sequential pieces of still image data.

7. The imaging device of claim 6,
wherein the synthesizing sub-unit calculates adjusted pixel values by adjusting brightness with respect to each pixel value obtained from the sequential pieces of still image data, depending on circumstances of still image data to which the each pixel value belongs to, and
wherein the synthesizing sub-unit determines the pixel value of the pixel at the same position in the synthesized image to be generated, by using all calculated adjusted pixel values and the exposure information associated with each of the obtained sequential pieces of still image data.

8. The imaging device of claim 7,
wherein the still image data writing unit writes the still image data into the recording medium after attaching a continuous shooting number to each piece of the still image data, the continuous shooting number indicating an order of each piece in the continuous shooting, and
wherein the synthesizing sub-unit generates a pixel at a position indicated by a coordinate (x,y) in the synthesized image to be generated, by calculating, with use of Equation 3, a pixel value P'(x,y) at the coordinate (x,y) in the synthesized image to be generated, $$P'(x, y) = \beta(x, y)\frac{\sum_{i=a}^{b} \alpha_i(x, y)P_i(x, y)}{\sum_{i=a}^{b} E_i} \quad \text{[Equation 3]}$$

in Equation 3, "a" represents a first continuous shooting number attached to the first still image data, "b" represents a second continuous shooting number attached to the second still image data, "Pi(x,y)" represents a pixel value of a pixel indicated by the coordinate (x,y) in a still image represented by a piece of still image data attached with continuous shooting number "i", "Ei" represents exposure information associated with an $i^{th}$ still image, "αi(x,y)" represents a constant for adjustment of brightness to be set for the pixel at the coordinate (x,y) of the $i^{th}$ piece of still image data, and "β(x, y)" represents a constant for adjustment of brightness to be set for a pixel indicated by the coordinate (x,y) in a still image after the synthesizing.

9. The imaging device of claim 1,
wherein the control unit further writes, respectively as first information and second information, preliminarily determined first initial value and second initial value, into the recording medium by associating the first initial value and the second initial value with all pieces of still image data generated by repeatedly controlling the imaging unit and the still image data writing unit,
wherein the determining sub-unit determines the first still image data and the second still image data by obtaining and storing the first information and the second information, and
wherein the obtaining sub-unit obtains the sequential pieces of still image data that starts with the first still image data indicated by the first information, and ends with the second still image data indicated by the second information.

10. The imaging device of claim 9,
wherein when receiving, from a user, a change instruction instructing to change at least one of the first information and the second information, the determining sub-unit further updates at least one of the first information and the second information in accordance with the received change instruction, and wherein the imaging device further comprises
an information writing unit operable to overwrite update-target information recorded in the recording medium with updated information held by the determining sub-unit.

11. The imaging device of claim 1,
wherein another piece of still image data that was obtained by a shooting which is different from the continuous shooting is recorded in the recording medium, and
wherein the determining sub-unit identifies a still image data group that is composed of one or more pieces of still image data associated with the continuous shooting mode identification information, and determines the first still image data and the second still image data out of the identified still image data group.

12. The imaging device of claim 11,
wherein the continuous shooting mode identification information is a directory name indicating a location where a plurality of pieces of still image data are stored, and
wherein the determining sub-unit identifies the still image data group by searching a directory indicated by the continuous shooting mode identification information.

13. The imaging device of claim 1,
wherein the control unit further writes, into the recording medium, a continuous shooting shutter speed indicating a shutter speed at the continuous shooting, by associating the continuous shooting shutter speed with all pieces of still image data generated by repeatedly controlling the imaging unit and the still image data writing unit, and
wherein the editing unit calculates a synthesized shutter speed indicating a shutter speed after the synthesizing, by multiplying the continuous shooting shutter speed by the number of pieces of still image data that are used for generating the synthesized image.

14. The imaging device of claim 13 further comprising
a display unit operable to display the continuous shooting shutter speed and the synthesized shutter speed.

15. The imaging device of claim 14 further comprising
a synthesized image data writing unit operable to write, into a predetermined storage area, synthesized image data and a synthesized shutter speed that is calculated with respect to the synthesized image data by the editing unit, by associating the synthesized image data with the synthesized shutter speed, the synthesized image data representing the generated synthesized image.

16. The imaging device of claim 1 further comprising
a synthesized image data writing unit operable to write synthesized image data representing the generated synthesized image, into a predetermined storage area.

17. The imaging device of claim 16,
wherein the predetermined storage area exists in the recording medium.

18. An imaging device for generating a plurality of still images continuously and generating a synthesized image from the still images, the imaging device comprising:
a continuous shooting mode operable to perform a process of storing sequentially, into a recording medium, a plurality of continuous pieces of still image data obtained by a continuous shooting, by repeatedly controlling an imaging unit that generates still image data from incident light and a still image data writing unit that writes the generated still image data into the recording medium;
an editing mode operable to, upon receiving an instruction to start generating a synthesized image from the plurality of continuous pieces of still image data obtained by the continuous shooting, generate the synthesized image by using the plurality of continuous pieces of still image data stored in the recording medium; and
a control unit operable to switch between the continuous shooting mode and the editing mode in accordance with a user operation:
wherein the continuous shooting mode further writes, as one group, all pieces of still image data generated by repeatedly controlling the imaging unit and the still image data writing unit, into the recording medium, by associating each piece of the still image data in the group with continuous shooting mode identification information indicating the continuous shooting,
wherein the editing mode generates the synthesized image by using one or more pieces of still image data among the still image data recorded in association with the continuous shooting mode identification information in the recording medium,
wherein the editing mode (i) determines first still image data and second still image data out of the generated pieces of still image data, (ii) obtains sequential pieces of still image data, which starts with the first still image data and ends with the second still image data, from the recording medium, and (iii) generates the synthesized image by synthesizing the obtained sequential pieces of still image data, and
wherein the plurality of continuous pieces of still image data includes more than two pieces of still image data.

19. An editing device for generating a synthesized image from a plurality of still images generated continuously by a continuous shooting, the editing device comprising:
a receiving unit operable to receive an instruction instructing to generate a synthesized image from a plurality of continuous pieces of still image data obtained by the continuous shooting;
a reading unit operable to, upon receiving the instruction, read out the plurality of continuous pieces of still image data obtained by the continuous shooting, from a recording medium; and
an editing unit operable to generate the synthesized image by using the read-out continuous pieces of still image data,
wherein the plurality of still images generated continuously by the continuous shooting, are recorded as one group in the recording medium, each piece of still image data in the group being associated with continuous shooting mode identification information indicating the continuous shooting,
wherein the reading unit reads out one or more pieces of still image data among the still image data recorded in association with the continuous shooting mode identification information in the recording medium,
wherein the editing unit includes:
a determining sub-unit operable to determine first still image data and second still image data out of the generated all of still image data;
an obtaining sub-unit operable to obtain sequential pieces of still image data, which starts with the first still image data and ends with the second still image data, from the recording medium; and
a synthesizing sub-unit operable to generate the synthesized image by synthesizing the obtained sequential pieces of still image data, and
wherein the plurality of continuous pieces of still image data includes more than two pieces of still image data.

20. An image processing method for use in an imaging device for generating a plurality of still images continuously and generating a synthesized image from the still images, wherein the imaging device includes a shooting button which, when pressed, instructs a continuous shooting, the image processing method comprising the steps of:
  imaging by generating still image data from incident light;
  writing the generated still image data into a recording medium;
  editing by generating a synthesized image by using a plurality of continuous pieces of still image data which are obtained by the continuous shooting; and
  controlling by performing a process of storing sequentially, into the recording medium, the plurality of continuous pieces of still image data obtained by the continuous shooting, by
  repeatedly controlling the imaging step and the still image data writing step while the shooting button is pressed to instruct the continuous shooting, and after the continuous shooting ends, entering a wait state to wait for a new instruction, and then upon receiving an instruction to start generating the synthesized image from the plurality of continuous pieces of still image data obtained by the continuous shooting, controlling the editing step to perform a process of generating the synthesized image by using the plurality of continuous pieces of still image data stored in the recording medium,
  wherein the controlling step further writes, as one group, all pieces of still image data generated by repeatedly controlling the imaging step and the still image data writing step, into the recording medium, by associating each piece of still image data in the group with continuous shooting mode identification information indicating the continuous shooting,
  wherein the editing step generates the synthesized image by using one or more pieces of still image data among the still image data recorded in association with the continuous shooting mode identification information in the recording medium,
  wherein the editing step includes sub-steps of:
  determining first still image data and second still image data out of the generated all pieces of still image data;
  obtaining sequential pieces of still image data, which starts with the first still image data and ends with the second still image data, from the recording medium; and
  generating the synthesized image by synthesizing the obtained sequential pieces of still image data, and
  wherein the plurality of continuous pieces of still image data includes more than two pieces of still image data.

21. A non-transitory computer-readable recording medium storing a computer program for image processing for use in an imaging device for generating a plurality of still images continuously and generating a synthesized image from the still images, wherein the imaging device includes a shooting button which, when pressed, instructs a continuous shooting, and wherein, when executed, the computer program causes a computer to execute a method comprising the steps of:
  imaging by generating still image data from incident light;
  writing the generated still image data into a recording medium;
  editing by generating a synthesized image by using a plurality of continuous pieces of still image data which are obtained by the continuous shooting; and
  controlling by performing a process of storing sequentially, into the recording medium, the plurality of continuous pieces of still image data obtained by the continuous shooting, by repeatedly controlling the imaging step and the still image data writing step while the shooting button is pressed to instruct the continuous shooting, and after the continuous shooting ends, entering a wait state to wait for a new instruction, and then upon receiving an instruction to start generating the synthesized image from the plurality of continuous pieces of still image data obtained by the continuous shooting, controlling the editing step to perform a process of generating the synthesized image by using the plurality of continuous pieces of still image data stored in the recording medium,
  wherein the controlling step further writes, as one group, all pieces of still image data generated by repeatedly controlling the imaging step and the still image data writing step, into the recording medium, by associating each piece of still image data in the group with continuous shooting mode identification information indicating the continuous shooting,
  wherein the editing step generates the synthesized image by using one or more pieces of still image data among the still image data recorded in association with the continuous shooting mode identification information in the recording medium,
  wherein the editing step includes sub-steps of:
  determining first still image data and second still image data out of the generated all pieces of still image data;
  obtaining sequential pieces of still image data, which starts with the first still image data and ends with the second still image data, from the recording medium; and
  generating the synthesized image by synthesizing the obtained sequential pieces of still image data, and
  wherein the plurality of continuous pieces of still image data includes more than two pieces of still image data.

22. An editing method for use in an editing device for generating a synthesized image from a plurality of still images generated continuously by a continuous shooting, the editing method comprising the steps of:
  receiving an instruction instructing to generate a synthesized image;
  reading out, upon receiving the instruction, a plurality of continuous pieces of still image data from a recording medium which stores the plurality of continuous pieces of still image data generated by the continuous shooting; and
  editing by generating the synthesized image by using the read-out continuous pieces of still image data,
  wherein the plurality of still images generated continuously by the continuous shooting are recorded as one group in the recording medium, each piece of still image data in the group being associated with continuous shooting mode identification information indicating the continuous shooting,
  wherein the reading step reads out one or more pieces of still image data among the still image data recorded in association with the continuous shooting mode identification information in the recording medium,
  wherein the editing step includes sub-steps of:
  determining first still image data and second still image data out of the generated all of still image data;
  obtaining sequential pieces of still image data, which starts with the first still image data and ends with the second still image data, from the recording medium; and
  generating the synthesize image by synthesizing the obtained sequential pieces of still image data, and
  wherein the plurality of continuous pieces of still image data includes more than two pieces of still image data.

23. A non-transitory computer-readable recording medium storing a computer program for image processing for use in an editing device for generating a synthesized image from a plurality of still images generated continuously by a continuous shooting, wherein, when executed, the computer program causing a computer to execute a method comprising the steps of:

receiving an instruction instructing to generate a synthesized image reading out, upon receiving the instruction, a plurality of continuous pieces of still image data from a recording medium which stores the plurality of continuous pieces of still image data generated by the continuous shooting; and editing by generate the synthesized image by using the read-out continuous pieces of still image data, wherein the plurality of still images generated continuously by the continuous shooting are recorded as one group in the recording medium, each piece of still image data in the group being associated with continuous shooting mode identification information indicating the continuous shooting, wherein the reading step reads out one or more pieces of still image data among the still image data recorded in association with the continuous shooting mode identification information in the recording medium, wherein the editing step includes sub-steps of:

determining first still image data and second still image data out of the generated all of still image data;

obtaining sequential pieces of still image data, which starts with the first still image data and ends with the second still image data, from the recording medium; and generating the synthesize image by synthesizing the obtained sequential pieces of still image data, and wherein the plurality of continuous pieces of still image data includes more than two pieces of still image data.

24. An imaging device for generating a plurality of still images continuously and generating a synthesized image from the still images, the imaging device comprising:

a shooting mode operable to perform (i) a continuous shooting process of storing sequentially, into a recording medium, a plurality of continuous pieces of still image data obtained by a continuous shooting, by repeatedly controlling (a) an imaging unit that generates still image data from incident light and (b) a still image data writing unit that writes the generated still image data into the recording medium, (ii) a still image shooting process of generating a piece of still image data and storing the generated piece of still image data into the recording medium, and (iii) a video image shooting process of generating video image data and storing the generated video image data into the recording medium;

a reproducing mode operable to reproduce shot image data;

a control unit operable to switch between the shooting mode and the reproducing mode in accordance with a user operation;

a display unit operable to, when the control unit switches to the reproducing mode, (i) display a list of images represented by image data shot in the past in the video image shooting process, images represented by image data shot in the past in the still image shooting process, and images represented by image data shot in the past in the continuous shooting process, and (ii) when a selection of a still image made on a displayed list by a user operation is received, display a first still image shot in the still image shooting process when the first still image is selected, reproduce and display a video image including a second still image shot in the video image shooting process when the second still image is selected, and, when a third still image shot in the continuous shooting process is selected, display an inquiry whether to continuously reproduce continuous pieces of still image data which were obtained by a continuous shooting and include the third still image, or generate a synthesized image from the plurality of still images; and an editing unit operable to, when an answer instructing to generate a synthesized image is input by a user operation while the inquiry is being displayed by the display unit, determine first still image data and second still image data out of the continuous pieces of still image data which were obtained by the continuous shooting, obtain sequential pieces of still image data, which starts with the first still image data and ends with the second still image data, from the recording medium, and generate a synthesized image by synthesizing the obtained sequential pieces of still image data, wherein the plurality of continuous pieces of still image data includes more than two pieces of still image data.

* * * * *